US012523477B2

(12) United States Patent
Gabriel et al.

(10) Patent No.: US 12,523,477 B2
(45) Date of Patent: Jan. 13, 2026

(54) PERSONAL PROTECTIVE EQUIPMENT FOR NAVIGATION AND MAP GENERATION WITHIN A HAZARDOUS ENVIRONMENT USING FIDUCIAL MARKERS

(71) Applicant: 3M INNOVATIVE PROPERTIES COMPANY, St. Paul, MN (US)

(72) Inventors: Nicholas T. Gabriel, Grand Rapids, MN (US); John M. Kruse, Minneapolis, MN (US); Gautam Singh, Woodbury, MN (US); Brian J. Stankiewicz, Mahtomedi, MN (US); Jason L. Aveldson, Prior Lake, MN (US); Glenn E. Casner, Woodbury, MN (US); Haleh Hagh-Shenas, Plymouth, MN (US); Frank T. Herfort, Neuss (DE); Ronald D. Jesme, Plymouth, MN (US); Steven G. Lucht, Woodbury, MN (US); Adam C. Nyland, St. Paul, MN (US); Jacob E. Odom, Savage, MN (US); Justin Tungjunyatham, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 497 days.

(21) Appl. No.: 18/010,454

(22) PCT Filed: Jun. 10, 2021

(86) PCT No.: PCT/IB2021/055120
§ 371 (c)(1),
(2) Date: Dec. 14, 2022

(87) PCT Pub. No.: WO2021/255592
PCT Pub. Date: Dec. 23, 2021

(65) Prior Publication Data
US 2023/0221123 A1 Jul. 13, 2023

Related U.S. Application Data

(60) Provisional application No. 63/039,006, filed on Jun. 15, 2020.

(51) Int. Cl.
*G01C 21/20* (2006.01)
*G01C 21/00* (2006.01)
(Continued)

(52) U.S. Cl.
CPC ......... *G01C 21/206* (2013.01); *G01C 21/383* (2020.08); *G01C 21/3844* (2020.08);
(Continued)

(58) Field of Classification Search
CPC .............. G01C 21/206; G01C 21/3844; G01C 21/383; G06T 7/74; G06T 7/248;
(Continued)

(56) References Cited

U.S. PATENT DOCUMENTS 7,263,379 B1 * 8/2007 Parkulo ................ G08B 25/009
370/254
7,457,628 B2 * 11/2008 Blumberg .......... G06Q 30/0623
455/457

(Continued)

OTHER PUBLICATIONS

Bogucki, Robert Andrzej, "Augmented reality device for first response scenarios" (2006). Master's Theses and Capstones. 219. https://scholars.unh.edu/thesis/219, Retrieved May 22, 2025 (Year: 2006).*
(Continued)

*Primary Examiner* — Peter M Bythrow
(74) *Attorney, Agent, or Firm* — Jonathan V. Sry

(57) ABSTRACT

The disclosure describes systems of navigating a hazardous environment. The system includes personal protective
(Continued)

equipment (PPE) and computing device(s) configured to process sensor data from the PPE, generate pose data of an agent based on the processed sensor data, and track the pose data as the agent moves through the hazardous environment. The PPE may include an inertial measurement device to generate inertial data and a radar device to generate radar data for detecting a presence or arrangement of objects in a visually obscured environment. The PPE may include a thermal image capture device to generate thermal image data for detecting and classifying thermal features of the hazardous environment. The PPE may include one or more sensors to detect a fiducial marker in a visually obscured environment for identifying features in the visually obscured environment. In these ways, the systems may more safely navigate the agent through the hazardous environment.

20 Claims, 14 Drawing Sheets

(51) Int. Cl.
 G01J 5/00 (2022.01)
 G01S 13/75 (2006.01)
 G02B 27/01 (2006.01)
 G06T 7/246 (2017.01)
 G06T 7/73 (2017.01)
 G06V 10/143 (2022.01)
 G06V 20/10 (2022.01)
(52) U.S. Cl.
 CPC ........ *G01S 13/751* (2013.01); *G02B 27/0172* (2013.01); *G02B 27/0179* (2013.01); *G06T 7/248* (2017.01); *G06T 7/74* (2017.01); *G06V 10/143* (2022.01); *G06V 20/10* (2022.01); *G01J 2005/0077* (2013.01); *G02B 2027/0138* (2013.01); *G02B 2027/0141* (2013.01); *G02B 2027/0187* (2013.01); *G06T 2207/10028* (2013.01); *G06T 2207/10048* (2013.01); *G06T 2207/30204* (2013.01)
(58) Field of Classification Search
 CPC ........... G06T 2207/10028; G06T 2207/10048; G06T 2207/30204; G06V 10/143; G06V 20/10; G01S 13/751; G02B 27/0172; G02B 27/0179; G02B 2027/0138; G02B 2027/0141; G02B 2027/0187; G01J 2005/0077
 See application file for complete search history.

(56) References Cited

U.S. PATENT DOCUMENTS

| | | | | |
|---|---|---|---|---|
| 9,814,278 B2* | 11/2017 | Chung | ............... | G08B 21/0446 |
| 9,964,951 B1* | 5/2018 | Dunn | ................... | G06V 20/17 |
| 9,998,804 B2* | 6/2018 | Awiszus | ........... | G06F 16/24568 |
| 10,019,881 B2* | 7/2018 | Chung | ................. | G08B 25/016 |
| 10,325,411 B1* | 6/2019 | Laney | .................. | G01C 21/20 |
| 10,402,663 B1* | 9/2019 | Tsai | ........................ | G06V 20/10 |
| 10,453,322 B2* | 10/2019 | Kaindl | .................... | B60Q 1/52 |
| 10,661,146 B2* | 5/2020 | Hausman | ............... | G06F 16/29 |
| 10,852,154 B1* | 12/2020 | Knas | .................. | G01C 21/3661 |
| 10,885,758 B2* | 1/2021 | Johnson | .................. | F16P 3/142 |
| 10,997,832 B1* | 5/2021 | Vadayadiyil Raveendran ........... G06F 18/22 |
| 11,302,170 B1* | 4/2022 | Salasoo | .............. | G08B 21/0492 |
| 2002/0072881 A1* | 6/2002 | Saitta | ...................... | A62B 3/00 703/1 |
| 2003/0214410 A1* | 11/2003 | Johnson | ............ | G08B 21/0211 340/539.13 |
| 2004/0021569 A1* | 2/2004 | Lepkofker | ............. | G08G 1/005 340/568.1 |
| 2006/0227998 A1* | 10/2006 | Hobgood | ............. | G06V 10/245 382/103 |
| 2006/0267833 A1* | 11/2006 | Langford | ............ | G01S 5/02524 342/174 |
| 2008/0077326 A1* | 3/2008 | Funk | ....................... | G01S 19/49 701/500 |
| 2012/0173204 A1* | 7/2012 | Padmanabhan | ......... | G01S 15/89 703/1 |
| 2013/0215281 A1* | 8/2013 | Hobby | .................. | H04B 1/385 348/207.1 |
| 2014/0375459 A1* | 12/2014 | Curtis | .................... | G08B 21/02 340/573.1 |
| 2016/0026253 A1* | 1/2016 | Bradski | ................ | H04N 13/128 345/8 |
| 2016/0106174 A1* | 4/2016 | Chung | ................. | A42B 3/0433 340/539.13 |
| 2017/0029213 A1* | 2/2017 | Johnson | .............. | G05D 1/0234 |
| 2017/0323129 A1* | 11/2017 | Davidson | ............. | G05D 1/0234 |
| 2017/0372216 A1* | 12/2017 | Awiszus | .................. | A61F 11/06 |
| 2018/0108236 A1* | 4/2018 | Kanukurthy | ......... | G06Q 50/265 |
| 2019/0073618 A1* | 3/2019 | Kanukurthy | ........... | G08B 21/02 |
| 2019/0094981 A1* | 3/2019 | Bradski | ................. | G06V 40/168 |
| 2020/0012829 A1* | 1/2020 | Davidson | ............. | G05D 1/0234 |
| 2020/0151943 A1* | 5/2020 | Navarrette | ............. | G02B 27/01 |
| 2021/0158564 A1* | 5/2021 | Chakravarty | ............ | G06T 7/73 |

OTHER PUBLICATIONS

Fuchs et al., "Indoor tracking for mission critical scenarios: A survey", Pervasive and Mobile Computing, vol. 7, Issue 1, Feb. 2011, pp. 1-15 (Year: 2011).*

* cited by examiner

PERSONAL PROTECTIVE EQUIPMENT FOR NAVIGATION AND MAP GENERATION WITHIN A HAZARDOUS ENVIRONMENT USING FIDUCIAL MARKERS

CROSS-REFERENCE TO RELATED APPLICATIONS

This Application is a national stage filing under 35 U.S.C. § 371 of International Application No. PCT/IB2021/055120, filed 10 Jun. 2021, which claims the benefit of Provisional U.S. Patent Application No. 63/039,006, filed 15 Jun. 2020, the entire disclosure of each of which is incorporated herein by reference.

TECHNICAL FIELD

The present application relates generally to personal protective equipment.

BACKGROUND

Personal protective equipment (PPE), such as respirators and protective eyewear, are used by emergency workers to provide protection in a hazardous environment. An emergency worker is often forced to rely on sight or audible instructions to navigate through the hazardous environment. In some instances, the emergency worker may be aided by various sensors, such as global positioning system (GPS) devices, to determine a current position of the emergency worker or indicate to a central command the position of the emergency worker. However, the hazardous environment may include various conditions, such as smoke or debris, that impair the sight of the emergency worker or may not be identifiable to the emergency worker, making navigation of the environment difficult and potentially dangerous for the emergency worker.

SUMMARY

In general, the disclosure describes personal protective equipment (PPE) articles, systems, and methods for protecting and aiding workers in hazardous environments. More specifically, technical solutions for PPE systems are described that enable assisted real-time map construction and navigation of hazardous environments even in conditions that would otherwise impair the sight of the workers and limit conventional camera-based systems. Techniques are described that enable adaptive, real-time integration of data collected from sensors associated with PPEs of multiple workers to construct more cohesive path and/or map information to aid the workers in navigating the environment.

As further described herein, the techniques provide resilient navigation and map construction in situations where, for example, smoke or extreme thermal events (e.g., hotspots or flares from active fires) would typically hinder such operations. Moreover, example systems described herein may further integrate and associate data indicative of such environmental conditions into navigation and mapping constructs to aid workers or other emergency personnel (e.g., responders/commanders) in safely traversing hazardous environments. PPE devices and systems described herein may, for example, process sensed data in real-time or pseudo-real-time to provide robust detection and classification of dynamically-changing thermal events, such as active fires, flashovers and steam, and dynamically construct two-dimensional (2) or three-dimensional (3d) mapping data that localizes the events as the workers traverse the hazardous environment, even when the environment may be visually obscured due to conditions that would hinder conventional systems.

In some examples described herein, the PPE systems capture and integrate detected motions of individual agents (e.g., safety workers) through a space, information detected about the immediate surroundings of the moving agent, features derived from the motions and the nearby space information, and confidence scores for the motions and space features. PPE systems may dynamically construct annotated motion tracks for each agent and aggregate information in a manner that automatically corrects any tracking errors and/or data conflicts. Various aspects of systems described herein can be used in real-time, even in situations where there is no pre-existing map, information is incomplete, and emergency egress guidance must be provided to the moving agents.

Example PPE systems are described that include a PPE, such as a breathing apparatus, a wearable pack, and headgear, worn by an agent in a hazardous environment, such as a firefighter or other emergency responder. As an example, the PPE includes specialized sensors, such as a radar device, a thermal image capture device, for capturing landmark feature information and/or thermal events within the hazardous environment, along with sensors such as one or more inertial measurement units (IMUs) for tracking motion for purposes of aiding localization of the agent. A computing device uses sensor data to generate and track pose data that represents a location and an orientation of the agent as the agent moves through the hazardous environment along with, in some examples, localized information for thermal events and/or landmark features that may otherwise be obscured by conventional sensors. The computing device may use the pose data and landmark information to identify and/or locate features in the environment, share feature data with other users, and integrate the identified features into a navigable composite map or path for the environment.

Some example PPE systems are configured with integrated radar sensor(s) to generate simultaneous localization and mapping information (e.g., SLAM data) for a visually obscured environment. In these example systems, the PPE includes one or more integrated inertial measurement devices and at least one radar scanning device for collecting inertial data indicative of motion and radar data generated by scanning the environment in real-time, respectively, as the agent moves through the visually obscured environment. As recognized herein, radar waves may be capable of transmitting through visually obscured media, such as smoke or steam, resulting in radar data that includes coarse-grain landmark information that can be processed by the computing device to discern at least a presence or general arrangement of features, such as walls, openings, blocked areas, within the visually obscured environment. The computing device may then integrate this data to provide enhanced SLAM operations by maintaining a sliding window of pose data for the agent based on the inertial data and the radar data, and may further construct in real-time a map of the visually obscured environment that more accurately reflects a localization of the agent relative to the coarse-grain arrangement of features within the visually obscured environment.

As additional examples, some example PPE systems described herein are configured to use thermal imaging to capture data indicative of thermal events, and to processes the data to classify the thermal events in a hazardous environment. In these example systems, the PPE includes one or more thermal image capture devices integrated with the PPE for collecting thermal image data as the agent moves through the hazardous environment. Thermal features, such as hot surfaces, may not be readily identifiable by the agent based on visual characteristics. The thermal image data captured by the PPE may include temporal or spatial temperature information of objects in the environment that exhibits various thermal patterns. The computing device identifies these patterns in the thermal image data and classifies thermal features within the environment. The computing device may build a map that positionally localizes the thermal features along with classification information indicating the type of thermal event (e.g., hot surface, thermal flashover, steam emission and the like), and/or may be configured to compute a route for the agent to avoid at least a subset of the thermal features based on the classifications of the thermal events.

As yet other examples, some example PPE systems described herein are configured to detect and process fiducial markers to aid navigation of the visually obscured environment. In these example systems, the PPE includes sensors, such as a radar device or a thermal image capture device, that are particularly configured for collecting fiducial information from fiducial markers, even though the fiducial markers may be distributed throughout or otherwise located within an environment that is visually obscured such that conventional means for reading a fiducial marker may be ineffective. These fiducial markers may be configured, as described herein, to transmit or reflect electromagnetic radiation, such as radar waves, infrared waves, or radio waves, that are capable of transmission through visually obscuring media, such as smoke, for detection by the sensors integrated within the PPE. The electromagnetic radiation includes or indicates, such as through a readable code, fiducial data associated with a location or feature within the environment. In such examples, the computing device is configured to generate pose data for the worker using the fiducial data to supplement data captured from other sensors, such as the radar sensor, to more accurately identify a location or orientation of the agent within the visually obscured environment.

In some examples, the PPE systems described herein are configured to build maps based on data from two or more agents using confidence-based heuristics. In these example systems, the computing device may generate pose data that includes pose metadata indicative of a confidence level for the sensor data used to generate the pose data or a confidence of features identified from the sensor data. For example, fiducial data may have a relatively high degree of confidence, and inertial data may have a degree of confidence that decreases over time or distance, thus representing error that may be induced due to drift of the IMU sensors. Upon receiving conflicting sensor data and/or pose information from a PPE associated with another agent, the computing device generates a consolidated map based on the pose metadata and confidence-based heuristics, such that the consolidated map includes a more accurate arrangement of features within the environment.

PPE systems described herein may be used in a variety of hazardous environments. Example PPE systems described herein enable real-time, multi-user localization and mapping of features in a hazardous environment with low visibility. In some instances, the computing device may be used to inform the user of an unfamiliar environment with low visibility. In some cases, the unfamiliar environment may include an unknown structure of a building, such as walls, doors, stairways, or egresses. In other cases, the unfamiliar environment may include fluctuating hazards, such as thermal events of varying size, intensity, location, mobility, or growth potential. In yet other cases, the unfamiliar environment may include moving coworkers or equipment that must be tracked, such as for a rescue operation. The low visibility may be caused by smoke or darkness, such that the environment is difficult for the user to learn and navigate. The sensors may function despite the low visibility, collecting data on features such as fiducials, three-dimensional landmarks, and heat sources. The computing device may construct a visual representation of the environment using the sensor data and, in some instances, data from computing devices of other users. The computing device may further present a route through the environment towards a destination, such as an egress or a coworker, while avoiding hazards identified using the feature data. In this way, the sensors and computing device improve the user's situational awareness.

In some examples, a system includes a personal protective equipment (PPE) and at least one computing device. The PPE is configured to be worn by an agent and includes a sensor assembly that includes a radar device configured to generate radar data and an inertial measurement device configured to generate inertial data. The at least one computing device includes a memory and one or more processors coupled to the memory. The at least one computing device is configured to process sensor data from the sensor assembly. The sensor data includes at least the radar data and the inertial data. The at least one computing device is further configured to generate pose data of the agent based on the processed sensor data. The pose data includes a location and an orientation of the agent as a function of time. The computing device is further configured to track the pose data of the agent as the agent moves through a visually obscured environment.

In some examples, a system includes a personal protective equipment (PPE) and at least one computing device. The PPE is configured to be worn by an agent and includes a sensor assembly that includes a thermal image capture device configured to generate thermal image data. The at least one computing device includes a memory and one or more processors coupled to the memory. The at least one computing device is configured to process sensor data from the sensor assembly. The sensor data includes at least the thermal image data. The at least one computing device is further configured to generate pose data of the agent based on the processed sensor data. The pose data includes a location and an orientation of the agent as a function of time. The at least one computing device is further configured to track the pose data of the agent as the agent moves through an environment. The at least one computing device is further configured to classify one or more thermal features of the environment based on the thermal image data.

In some examples, a system includes a personal protective equipment (PPE) and at least one computing device. The PPE is configured to be worn by an agent and includes a sensor assembly that includes one or more sensors configured to generate sensor data that includes an indication of a fiducial marker in a visually obscured environment. The at least one computing device includes a memory and one or more processors coupled to the memory. The at least one computing device is configured to process the sensor data from the sensor assembly to extract fiducial data from the indication of the fiducial marker. The at least one computing device is further configured to generate pose data of the agent based on the fiducial data. The pose data includes a location and an orientation of the agent as a function of time. The at least one computing device is further configured to track the pose data of the agent as the agent moves through the visually obscured environment.

The details of one or more examples are set forth in the accompanying drawings and the description below. Other features, objects, and advantages of the disclosure will be apparent from the description, the drawings, and the claims.

DETAILED DESCRIPTION

Figure 1:
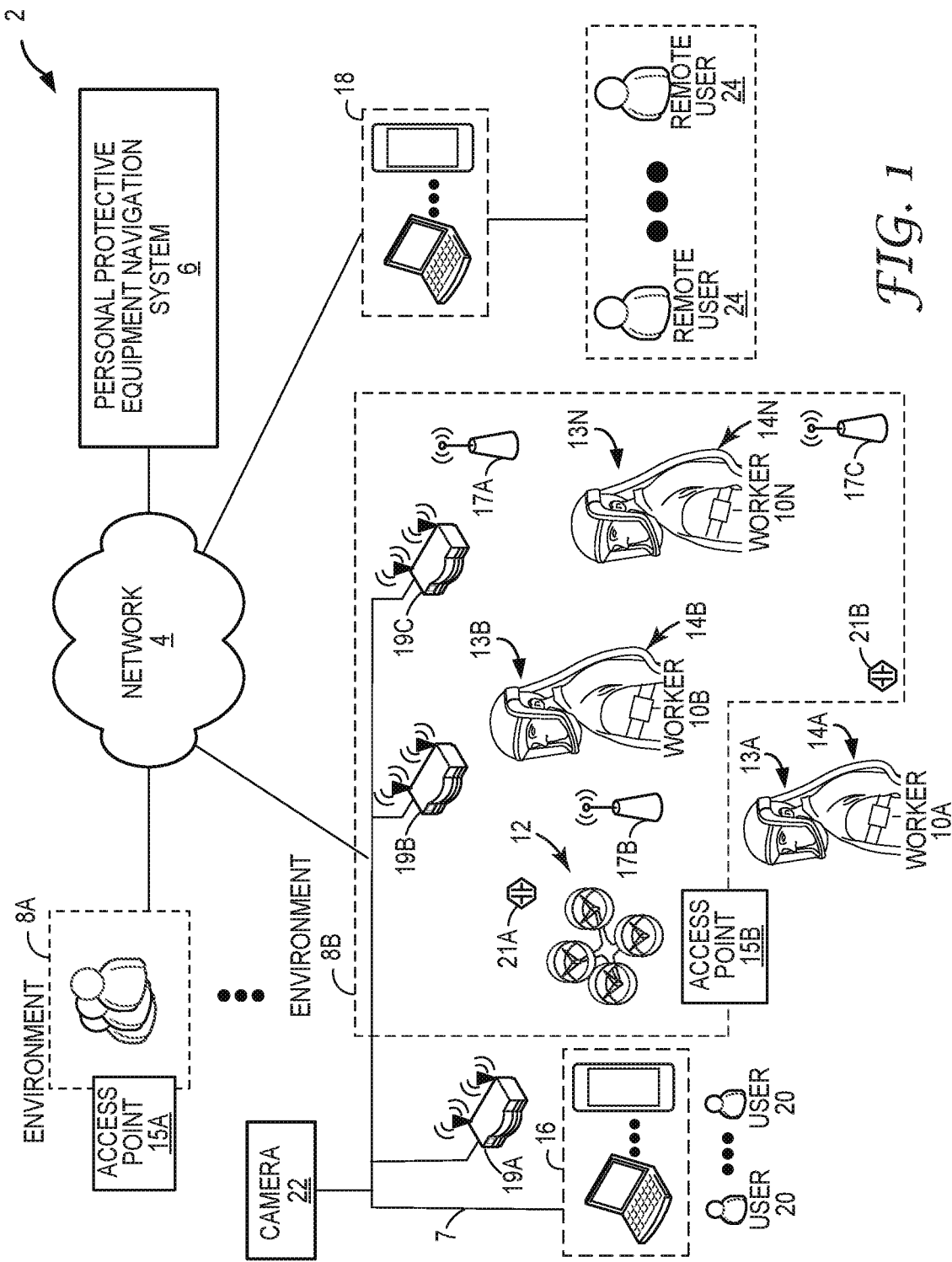
FIG. 1 is a block diagram illustrating a system that employs a personal protection equipment navigation system (PPENS) across one or more navigation environments, in accordance with one aspect of the present disclosure.

PPE systems are described that enable assisted real-time map construction and navigation of hazardous environments even in conditions that would otherwise impair the sight of workers and limit conventional camera-based systems. Techniques are described that enable adaptive, real-time integration of data collected from sensors associated with PPEs of multiple workers to construct more cohesive path and/or map information to aid the workers in navigating the environment. As further described herein, the techniques provide resilient navigation and map construction in situations where, for example, smoke or extreme thermal events (e.g., hotspots or flares from active fires) would typically hinder such operations. Moreover, example systems described herein may further integrate and associate data indicative of such environmental conditions into navigation and mapping constructs to aid workers or other emergency personnel (e.g., responders/commanders) in safely traversing hazardous environments.

In general, in addition to posing physical hazards to the agent, an environment may be visually obscured, such as with smoke or airborne particulates. As an agent wearing enhanced PPE navigates the environment, the computing device described herein is configured to utilize data captured by sensors of the enhanced PPEs worn by one or more agents, to generate pose information for each agent and to track the poses of the user relative to features of the environment using, for example, radar data from a radar device integrated within the PPE. Radar data may provide relatively coarse-grain information that indicates a presence or arrangement of features, such as a wall or a door, within the visually obscured environment that may not otherwise be detected by the agent unaided or through the use of short wavelength detectors. For example, unlike visible light, which may scatter in smoke, radar waves may penetrate smoke and reflect off various objects in the environment with relatively little scattering.

In some instances, the enhanced PPE and computing device may use the radar data in combination with inertial data from an inertial measurement device to generate the pose information and to perform simultaneous localization and mapping (SLAM) for the one or more agents within the hazardous environment. For example, the inertial data may provide translation information that drifts over time such that, as the agent progresses from a known point, the inertial data may become less reliable. The PPE supplements the inertial data with radar data to more accurately generate poses of the agent, such as by generating translation information or identifying features that may be used as a reference point. In some instances, the PPE may use the radar data alone or in combination with other data to identify features within the environment. For example, the radar data may provide information regarding a presence or arrangement of features within the environment, such as a presence or distance to a wall or identification of a doorway. The computing device may use the poses and/or features to generate a map for the user, determine a route for the user through the hazardous environment, or share information about the hazardous environment with other users, such as another agent in the environment or a central command monitoring the environment. In this way, PPE discussed herein may aid the user in more safely and accurately navigating the visually obscured environment.

According to some aspects of the disclosure, the enhanced PPE and computing device may aid the agent in identifying various thermal features or events in the environment, such as smoke or hot air, that may be difficult to visually identify, such as due to visual obscurations in the environment or lack of information about the environment. As the agent navigates the environment, the computing device classifies thermal features in the environment based on thermal image data from a thermal image device on the PPE. For example, thermal features may exhibit thermal properties (e.g., temperature) that vary temporally or spatially according to certain patterns. The computing device may identify and/or classify these thermal features based on a temporal or spatial signature indicated in the thermal image data. In this way, PPE discussed herein may aid the user in quickly and accurately identifying and avoiding potentially dangerous thermal features or events.

According to some aspects of the disclosure, the enhanced PPE and computing device, in combination with various fiducial markers in a visually obscured environment, may aid the agent in navigating the visually obscured environment. As the agent navigates the visually obscured environment, the computing device may detect a fiducial marker using radar data, thermal image data, or any other sensor data capable of identifying the fiducial marker in the visually obscured environment. For example, the fiducial marker may include a reflective surface that reflects electromagnetic radiation according to a particular pattern or may include a transmitter for transmitting a wireless signal that includes fiducial data. The computing device may extract fiducial data from an image or signal of the fiducial marker and identify one or more features of the environment based on the fiducial data. For example, the fiducial data may indicate a type of feature (e.g., an exit) or a specific feature (e.g., a particular exit) adjacent to the fiducial marker with a high degree of confidence compared to identification of that feature by, for example, a point cloud or other analytic method. In this way, enhanced PPE discussed herein may aid the wearer in more accurately navigating the visually obscured environment.

In some instances, enhanced PPE discussed herein may be used to reconcile and generate composite maps using data from two or more users. As the user navigates the environment, the computing device may determine poses with various degrees of confidence related to sensor accuracy, feature identification, or environmental knowledge. As examples, translation information of inertial data may drift over time, and radar data may provide a relatively low spatial resolution of objects. The computing device may encode these various degrees of confidence as metadata of sensor, pose, and/or map data generated by the user, and may employ a variety of confidence-based heuristics to reconcile differences between sensor, pose, and/or map data exchanged between computing devices of two or more users. In this way, PPE discussed herein may generate more accurate routes or maps based on data from multiple users.

In these various ways, PPE systems described herein may aid an agent in navigating a hazardous and/or visually obscured environment. For example, as an agent travels through a visually obscured environment, the computing device may use radar to more accurately track the position or orientation of the agent and identify features within the environment that may not otherwise be identified through the visually obscuring medium. Upon encountering another agent, the computing device may exchange data with the agent and build a consolidated map based on higher-confidence data from both agents. The computing device may use thermal imaging to identify potential thermal events and route the agent around the thermal events. The sensors may detect, and the computing device may identify, a fiducial marker through the visually obscured medium and identify a position or orientation of the agent based on the fiducial marker with a high degree of confidence.

In some instances, PPE discussed herein may be used by firefighters to navigate potentially dangerous buildings. For example, the computing device may use radar data to identify a visually obscured wall between the user and another user, use thermal image data to identify a potential flashover, or use radar or thermal image data to identify a fiducial marker indicating a position or orientation of the user within the building, such as relative to a formal (e.g., a door) or informal (e.g., a window) exit.

FIG. 1 is a block diagram illustrating an example computing system 2 that includes an PPE navigation system (PPENS) 6 for providing navigation to agents 10A-10N (collectively, "agent 10") wearing one or more articles of enhanced PPE 13 through environment 8A, 8B (collectively, "environment 8"), in accordance with various techniques of this disclosure. In general, PPENS 6 may provide data acquisition, navigation, map building, and alert generation to agents 10 within and/or users outside environment 8. As further described below, PPENS 6 may provide an integrated suite of PPE navigation tools and implement various techniques of this disclosure. That is, PPENS 6 may provide an integrated, end-to-end system for processing sensor data from personal protective equipment worn by agents 10 within one or more environments 8, and providing navigation to agents 10 through one or more environments 8 using the sensor data. The techniques of this disclosure may be realized within various parts of computing environment 2.

As shown in the example of FIG. 1, system 2 represents a computing environment in which computing device(s) within a plurality of physical environments 8A, 8B electronically communicate with PPENS 6 via one or more computer networks 4. Each environment 8 represents a physical environment, such as a hazardous work or emergency environment, in which one or more individuals, such as agent 10, utilize PPE while engaging in tasks or activities within the respective environment. For example, each environment 8 may be a hazardous fire environment in which agents 10 are firefighters utilizing breathing equipment while engaging a fire in the fire environment or navigating through the fire environment. Environments 8 include, but are not limited to, fire environments, construction environments, mining environments, battlefield environments, and the like. In some instances, environment 8 is a visually obscured environment. A visually obscured environment may be any environment in a user, such as agent 10, may not navigate using only visible light, such as natural daylight or light from a flashlight. As one example, the visually obscured environment may include a fire environment in which smoke is present, such that agent 10 may not clearly view objects through the smoke.

In this example, environment 8A is shown as generally having agents 10, while environment 8B is shown in expanded form to provide a more detailed example. A plurality of agents 10A-10N are shown wearing respective articles of PPE 13A-13N. As shown, for example, in FIG. 1, each agent 10 may wear a breathing apparatus as an article of PPE 13A-13N, while in other examples, agents 10 may use one or more additional or alternative articles of PPE 13. PPE 13 is configured to be worn by an agent. For example, PPE 13 may include a breathing apparatus that includes a wearable pack and headgear, such that a sensor assembly may be integrated within a frame (e.g., a structural component, such as an outer surface or pocket) of the wearable pack, the headgear (e.g., a structural component of a helmet), and/or a handheld device.

Each of PPE 13 includes a sensor assembly that includes sensors, and, in some examples, processing electronics configured to capture data in real-time as a user (e.g., agent 10) engages in activities while wearing PPE 13. PPE 13 may include a number of sensors for sensing including, but not limited to, a radar device, an inertial measurement device, a thermal image capture device, an image capture device (e.g., a camera), an audio capture device (e.g., a microphone), and the like. Each of the above-noted sensors may generate sensor data including, but not limited to, radar data, inertial data, thermal image data, image data, audio data, and the like, as described herein. Sensors on PPE 13 may be selected according to various conditions of environment 8, as will be described further below. For example, for a visually obscured environment, PPE 13 may include a radar device for collecting radar data. For example, PPE 13 may include one or more radar antennas configured to transmit and/or receive radio waves and/or microwaves (e.g., electromagnetic waves with a wavelength between about 1 mm and about 10,000 km). As another example, for an environment relatively insulated from external wireless positioning systems (e.g., global positioning system (GPS), cellular systems), PPE 13 may include an inertial measurement device, such as one or more magnetic field sensors, compasses, and/or accelerometers. As another example, for an environment that includes thermal hazards, PPE 13 may include a thermal image capture device. For example, PPE 13 may include one or more thermographic cameras configured to receive mid and/or far-infrared radiation (e.g., electromagnetic waves with a wavelength between about 1 μm and about 1 mm).

In addition, each of PPE 13 may include one or more output devices for outputting data that is indicative of operation of PPE 13 and/or generating and outputting communications to the respective agent 10. For example, PPE 13 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

In some instances, environment 8 may include one or more unmanned vehicles 12. Unmanned vehicle 12 may include any autonomous, semiautonomous, or manual vehicle capable of navigating environment 8A. Unmanned vehicle 12 may include a sensor assembly, such as the sensor assembly described above, configured to capture data in real-time as unmanned vehicle 12 proceeds through environment 8. Unmanned vehicle 12 may supplement one or more activities engaged in by agent 10.

In some instances, environment 8 may include one or more fiducial markers 21. Fiducial marker 21 may be configured to provide a reference point to agent 10 in environment 8A, such as when environment 8A is a visually obscured environment. For example, fiducial marker 21 may indicate a position of agent 10 in environment 8A, such as by indicating one or more landmark features in environment 8A. The one or more landmark features may include an object, a door, a window, a sign, a fiducial, an entry, an exit, a stairway, a room status, or any other point of reference or interest to agent 10. Fiducial marker 21 includes transmitted or encoded fiducial data. For example, fiducial data may include a code stored or embodied on fiducial marker 21. As another example, fiducial marker 21 may include a machine-readable 2-dimensional pattern, such as barcodes, QR codes, etc. Correspondingly, PPE 13 may include one or more sensors configured to extract fiducial data from an indication of the fiducial marker.

In some examples, fiducial marker 21 is passive and includes a reflective surface configured to reflect electromagnetic radiation corresponding to a pattern or level of emissivity in the surface. Fiducial markers 21 may be configured to reflect and/or emit visible radiation, near-infrared (NIR) radiation, thermal wavelength radiation, or radar information. In some examples, the electromagnetic radiation may have a wavelength greater than about 1 micrometer (e.g., mid and far-infrared radiation, microwaves, and/or radio waves). As one example, a reflective surface of fiducial marker 21 may be configured to reflect and/or emit infrared radiation, such that PPE 13 that includes a thermal image capture device may be configured to generate thermal image data from reflected infrared light. As another example, a reflective surface of fiducial marker 21 may be configured to reflect radio waves or microwaves, such that PPE 13 that includes a radar device may be configured to generate radar data from reflected radio waves or microwaves. In some examples, fiducial marker 21 is active and includes a transmitter configured to emit a wireless signal that includes the fiducial data, including active tag technologies such as radio-frequency identification (RFID), Bluetooth, Wi-Fi, etc. For example, PPE 13 may be configured to detect the wireless signal based on a relative proximity to fiducial marker 21. In some examples, fiducial marker 21 may be a multi-modal fiducial marker that includes more than one type of fiducial marker. For example, fiducial marker 21 may include any combination passive and/or active fiducial markers.

In general, each of environments 8 includes computing facilities (e.g., a local area network) by which PPE 13 is able to communicate with PPENS 6 and by which PPENS 6 is able to communicate with the display device. For example, environment 8 may be configured with wireless technology, such as 802.11 wireless networks, 802.15 ZigBee networks, or the like. In the example of FIG. 1, environment 8B includes a local network 7 that provides a packet-based transport medium for communicating with PPENS 6 via network 4. In addition, environment 8B includes a plurality of wireless access points 19A, 19B, 19C (collectively, "wireless access points 19") that may be geographically distributed throughout the environment and/or adjacent to the environment to provide support for wireless communications throughout environment 8B.

Each of PPE 13 may be configured to communicate data, such as sensed motions, events and conditions, via wireless communications, such as via 802.11 Wi-Fi protocols, Bluetooth protocols or the like. PPE 13 may, for example, communicate directly with a wireless access point 19. As another example, each agent 10 may be equipped with a respective one of wearable communication hubs 14A-14N that enable and facilitate communication between PPE 13 and PPENS 6. For example, PPE 13 for the respective agents 10 may communicate with a respective communication hub 14 via Bluetooth or other short-range protocol, and the communication hubs may communicate with PPENS 6 via wireless communications processed by wireless access point 19. Although shown as wearable devices, hubs 14 may be implemented as stand-alone devices deployed within environment 8B.

In general, each of hubs 14 operates as a wireless device for PPE 13 relaying communications to and from PPE 13, and may be capable of buffering usage data in case communication is lost with PPENS 6. Moreover, each of hubs 14 is programmable via PPENS 6 so that local alert rules may be installed and executed without requiring a connection to the cloud. As such, each of hubs 14 provides a relay of streams of usage data from PPE 13 and/or other PPEs within the respective environment and provides a local computing environment for localized alerting based on streams of events in the event communication with PPENS 6 is lost.

As shown in the example of FIG. 1, an environment, such as environment 8B, may also contain one or more wireless-enabled beacons, such as beacons 17A-17C, that provide accurate location information within the hazardous environment. For example, beacons 17A-17B may be GPS-enabled such that a controller within the respective beacon may be able to precisely determine the position of the respective beacon. Based on wireless communications with one or more of beacons 17, a given PPE 13 or communication hub 14 worn by an agent 10 is configured to determine the location of agent 10 within environment 8B. In this way, event data reported to PPENS 6 may be stamped with positional information to aid analysis, reporting, and/or analytics performed by PPENS 6.

In addition, each of environments 8 include computing facilities that provide an operating environment for end-user computing devices 16 for interacting with PPENS 6 via network 4. For example, each of environments 8 typically includes one or more command centers responsible for overseeing navigation within environment 8. In general, each user 20 may interact with computing devices 16 to access PPENS 6. Similarly, remote users 24 may use computing devices 18 to interact with PPENS 6 via network 4. For purposes of example, the end-user computing devices 16 may be laptops, desktop computers, mobile devices, such as tablets or so-called smart phones, or the like.

Users 20, 24 may interact with PPENS 6 to control and actively manage many aspects of mapping and navigation, such as accessing and viewing immediate sensory environment data, determination of information relating to the immediate sensory environment, analytics, and/or reporting. For example, users 20, 24 may review information acquired, determined, and/or stored by PPENS 6. In addition, users 20, 24 may interact with PPENS 6 to set a route destination, update a hazard level score of a thermal event, identify an object, or the like.

Further, PPENS 6 may integrate an event processing platform configured to process thousands or even millions of concurrent streams of events from digitally enabled PPEs, such as PPE 13. An underlying analytics engine of PPENS 6 may apply historical data and models to the inbound streams to determine information relevant to a field of view of agent 10, such as predicted occurrences of thermal events, vicinity of agents 10 to a potential hazard, or the like. Further, PPENS 6 provides real time alerting and reporting to notify agents 10 and/or users 20, 24 of any potential hazards, thermal events, landmarks, objects, agents, routes, or other information that may be useful to agent 10 viewing a specific area of environment 8. The analytics engine of PPENS 6 may, in some examples, apply analytics to identify relationships or correlations between field of views, environment conditions, and other factors, and analyze whether to provide one or more indicator images to agent 10 about the respective field of view.

In this way, PPENS 6 tightly integrates comprehensive tools for managing environment navigation and mapping with an underlying analytics engine and communication system to provide data acquisition, monitoring, activity logging, reporting, predictive analytics, map construction, map combination, route guidance determination, and alert generation. Moreover, PPENS 6 provides a communication system for operation and utilization by and between the various elements of system 2. Users 20, 24 may access PPENS 6 to view results on any analytics performed by PPENS 6 on data acquired from communication hub 14. In some examples, PPENS 6 may present a web-based interface via a web server (e.g., an HTTPS server), or client-side applications may be deployed for devices of computing devices 16, 18 used by users 20, 24, such as desktop computers, laptop computers, mobile devices, such as smartphones and tablets, or the like.

In some examples, PPENS 6 may provide a database query engine for directly querying PPENS 6 to view acquired landmarks, paths, thermal events, and any results of the analytic engine, e.g., by the way of dashboards, alert notifications, reports or the like. That is, users 20, 24, or software executing on computing devices 16, 18, may submit queries to PPENS 6 and receive data corresponding to the queries for presentation in the form of one or more reports or dashboards. Such dashboards may provide various insights regarding system 2, such as identifications of any spaces within environments 2 for which unusually anomalous thermal events have been or are predicted to occur, identifications of any of environments 2 exhibiting anomalous occurrences of thermal events relative to other environments, potential hazards indicated by agents 10, or the like.

As illustrated in detail below, PPENS 6 may improve workflows for individuals tasked with navigating agents 10 through environment 8. That is, the techniques of this disclosure may enable active environment mapping and allow a command center to take preventative or corrective actions with respect to certain spaces within environment 8, potential hazards, or individual agents 10. The techniques may further allow the command center to implement workflow procedures that are data-driven by an underlying analytical engine.

PPENS 6 may be configured to process sensor data from PPE 13. For example, PPE 13, directly or through communication hub 14, may transmit sensor data to PPENS 6 as agent 10 moves through environment 8. PPENS 6 may be configured to generate pose data of the agent based on the processed sensor data. The pose data includes a location and an orientation of agent 10 as a function of time. PPENS 6 may be configured to track the pose data of agent 10 as agent 10 moves through environment 8.

In some instances, environment 8 may be a visually obscured environment. PPE 13 includes a radar device configured to generate radar data and an inertial measurement device configured to generate inertial data. PPENS 6 may be configured to process sensor data that includes the radar data and the inertial data. The radar data may include coarse-grain information indicating a presence or arrangement of object within the visually obscured environment. PPENS 6 may be configured to generate pose data of agent 10 based on the processed sensor data and track the pose data of agent 10 as agent 10 moves through the visually obscured environment 8. PPENS 6 may be configured to determine the presence or arrangement of objects within the visually obscured environment based on the radar data. PPENS 6 may be configured to build, using the radar data, a map of the visually obscured environment.

In some instances, environment 8 may be a hazardous environment that includes various thermal features or events. PPE 13 includes a thermal image capture device configured to generate thermal image data. PPENS 6 may be configured to process sensor data that includes the thermal image data. The thermal image data may include a temporal signature that indicates a change in temperature of the thermal features over time or a spatial signature that indicates a change in temperature of the thermal features over space. In some instances, PPENS 6 may use motion sensor data (e.g., from an inertial measurement device, a radar device, or the like) to differentiate motion of the thermal sensor from motion within the thermal data. PPENS 6 may be configured to classify one or more thermal features of environment 8 based on the thermal image data. For example, the thermal features may include a temperature, a fire, a presence of smoke, a hot surface, a presence of hot air, a presence of layers of varying temperatures, or the like.

In some instances, environment 8 may be a visually obscured environment that includes one or more fiducial markers 21. PPE 13 may include one or more sensors configured to generate sensor data that includes an indication of fiducial marker 21 in a visually obscured environment 8. For example, PPE 13 may include a radar device, a thermal image capture device, a wireless transmitter, or the like. PPENS 6 may be configured to process the sensor data to extract fiducial data from the indication of the fiducial marker. PPENS 6 may be configured to generate pose data of agent 10 based on the fiducial data and track the pose data of agent 10 as agent 10 moves through visually obscured environment 8.

Figure 2:
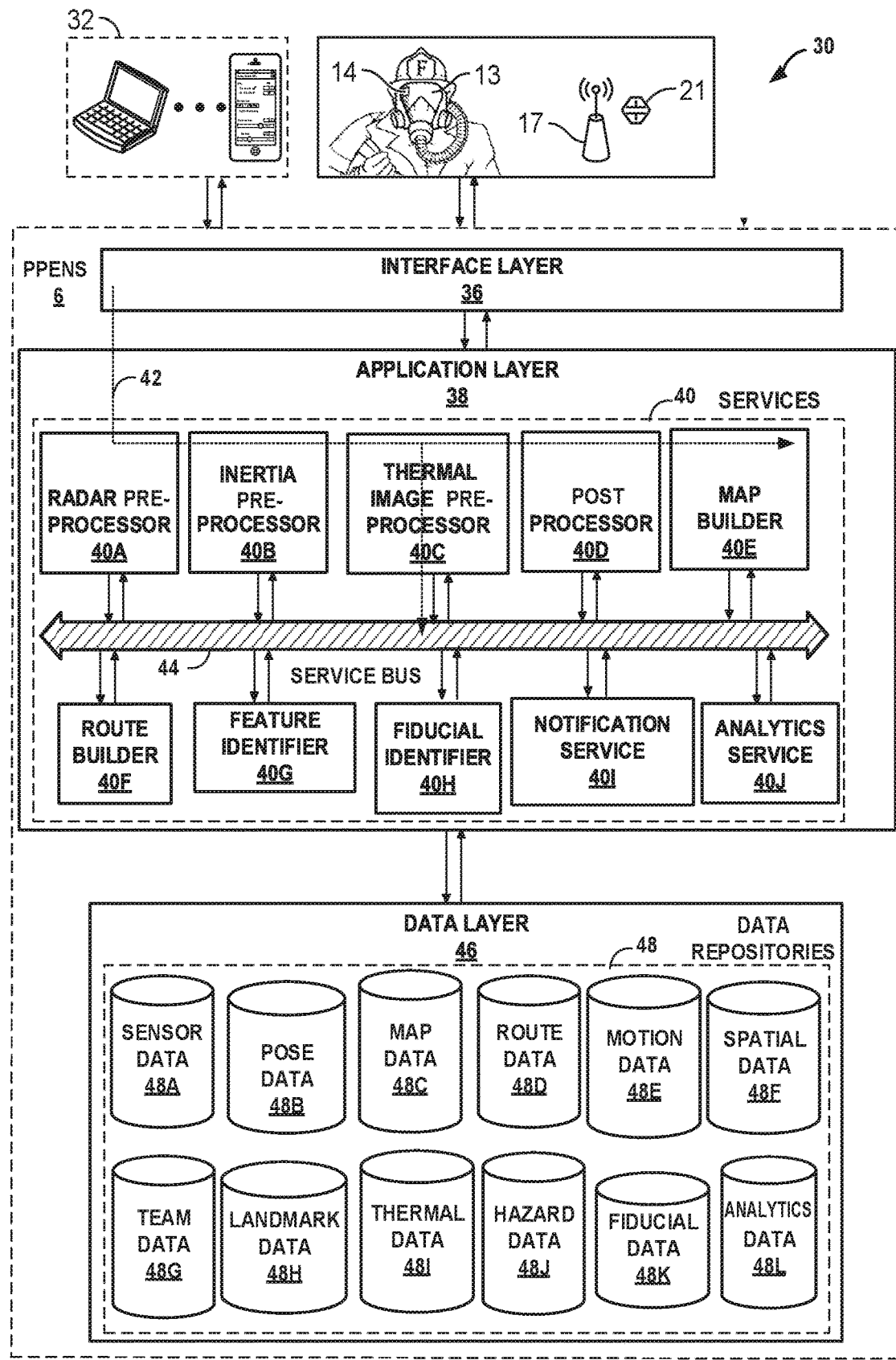
FIG. 2 is a block diagram providing an operating perspective of a PPENS when hosted as a cloud-based platform capable of supporting multiple, distinct environments having agents that wear one or more articles of PPE, in accordance with one aspect of the present disclosure.

FIG. 2 is a block diagram providing an operating perspective of PPENS 6 when hosted as a cloud-based platform capable of supporting multiple, distinct environments 8 having an overall population of agents 10 equipped with PPE 13, in accordance with various techniques of this disclosure. In the example of FIG. 2, the components of PPENS 6 are arranged according to multiple logical layers that implement the techniques of the disclosure. Each layer may be implemented by one or more modules and may include hardware, software, or a combination of hardware and software.

In some examples, computing devices 32, PPE 13, communication hubs 14 (illustrated in FIG. 2 as integrated with PPE 13), and/or beacons 17, operate as clients 30 that communicate with PPENS 6 via interface layer 36. Computing devices 32 typically execute client software applications, such as desktop applications, mobile applications, and/or web applications. Computing devices 32 may represent any of computing devices 16, 18 of FIG. 1. Examples of computing devices 32 may include, but are not limited to, a portable or mobile computing device (e.g., smartphone, wearable computing device, tablet), laptop computers, desktop computers, smart television platforms, and/or servers.

In some examples, computing devices 32, PPE 13, communication hubs 14, and/or beacons 17 may communicate with PPENS 6 to send and receive information (e.g., position and orientation) related to a field of view of agents 10, determination of information related to the field of view, potential hazards and/or thermal events, generation of indicator images, alert generation, or the like. Client applications executing on computing devices 32 may communicate with PPENS 6 to send and receive information that is retrieved, stored, generated, and/or otherwise processed by services 40. For example, the client applications may request and edit potential hazards or thermal events, route navigation, object or agent 10 identification, or any other information described herein including analytical data stored at and/or managed by PPENS 6. In some examples, client applications may request, and display information generated by PPENS 6, such as alerts and/or indicator images. In addition, the client applications may interact with PPENS 6 to query for analytics information about acquired landmarks, paths, thermal events, or the like. The client applications may output for display information received from PPENS 6 to visualize such information for users of clients 30. As further illustrated and described below, PPENS 6 may provide information to the client applications, which the client applications output for display in user interfaces.

Client applications executing on computing devices 32 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPENS 6. In the example of a web application, PPENS 6 may receive requests from the web application (e.g., the web browser), process the requests, and send one or more responses back to the web application. In this way, the collection of web pages, the client-side processing web application, and the server-side processing performed by PPENS 6 collectively provides the functionality to perform techniques of this disclosure. In this way, client applications use various services of PPENS 6 in accordance with techniques of this disclosure, and the applications may operate within different computing environments (e.g., a desktop operating system, mobile operating system, web browser, or other processors or processing circuitry, to name only a few examples).

As shown in FIG. 2, in some examples, PPENS 6 includes an interface layer 36 that represents a set of application programming interfaces (API) or protocol interface presented and supported by PPENS 6. Interface layer 36 initially receives messages from any of clients 30 for further processing at PPENS 6. Interface layer 36 may therefore provide one or more interfaces that are available to client applications executing on clients 30. In some examples, the interfaces may be application programming interfaces (APIs) that are accessible over network 4. In some example approaches, interface layer 36 may be implemented with one or more web servers. The one or more web servers may receive incoming requests, may process, and/or may forward information from the requests to services 40, and may provide one or more responses, based on information received from services 40, to the client application that initially sent the request. In some examples, the one or more web servers that implement interface layer 36 may include a runtime environment to deploy program logic that provides the one or more interfaces. As further described below, each service may provide a group of one or more interfaces that are accessible via interface layer 36.

In some examples, interface layer 36 may provide Representational State Transfer (RESTful) interfaces that use HTTP methods to interact with services and manipulate resources of PPENS 6. In such examples, services 40 may generate JavaScript Object Notation (JSON) messages that interface layer 36 sends back to the client application that submitted the initial request. In some examples, interface layer 36 provides web services using Simple Object Access Protocol (SOAP) to process requests from client applications. In still other examples, interface layer 36 may use Remote Procedure Calls (RPC) to process requests from clients 30. Upon receiving a request from a client application to use one or more services 40, interface layer 36 sends the information to application layer 38, which includes services 40.

As shown in FIG. 2, PPENS 6 also includes an application layer 38 that represents a collection of services for implementing much of the underlying operations of PPENS 6. Application layer 38 receives information included in requests received from client applications that are forwarded by interface layer 36 and processes the information received according to one or more of services 40 invoked by the requests. Application layer 38 may be implemented as one or more discrete software services executing on one or more application servers, e.g., physical or virtual machines. That is, the application servers provide runtime environments for execution of services 40. In some examples, the functionality of interface layer 36 as described above and the functionality of application layer 38 may be implemented at the same server.

Application layer 38 may include one or more separate software services 40 (e.g., processes) that may communicate via, for example, a logical service bus 44. Service bus 44 generally represents a logical interconnection or set of interfaces that allows different services to send messages to other services, such as by a publish/subscription communication model. For example, each of services 40 may subscribe to specific types of messages based on criteria set for the respective service. When a service publishes a message of a particular type on service bus 44, other services that subscribe to messages of that type will receive the message. In this way, each of services 40 may communicate information to one another. As another example, services 40 may communicate in point-to-point fashion using sockets or other communication mechanism. Before describing the functionality of each of services 40, the layers are briefly described herein.

Data layer 46 of PPENS 6 represents a datastore 48 that provides persistence for information in PPENS 6 using one or more datastores 48. A datastore, generally, may be any data structure or software that stores and/or manages data. Examples of datastores include but are not limited to relational databases, multi-dimensional databases, maps, and/or hash tables. Data layer 46 may be implemented using Relational Database Management System (RDBMS) software to manage information in datastores 48. The RDBMS software may manage one or more datastores 48, which may be accessed using Structured Query Language (SQL). Information in the one or more databases may be stored, retrieved, and modified using the RDBMS software. In some examples, data layer 46 may be implemented using an Object Database Management System (ODBMS), Online Analytical Processing (OLAP) database, or any other suitable data management system.

As shown in FIG. 2, each of services 40A-40J is implemented in a modular form within PPENS 6. Although shown as separate modules for each service, in some examples the functionality of two or more services may be combined into a single module or component. Each of services 40 may be implemented in software, hardware, or a combination of hardware and software. Moreover, services 40 may be implemented as standalone devices, separate virtual machines or containers, processes, threads, or software instructions generally for execution on one or more physical processors or processing circuitry.

In some examples, one or more of services 40 may each provide one or more interfaces 42 that are exposed through interface layer 36. Accordingly, client applications of computing devices 32 may call one or more interfaces 42 of one or more of services 40 to perform techniques of this disclosure.

In some cases, services 40 may include a radar pre-processor 40A configured to process radar data into a form usable for determining pose and/or feature information. For example, PPE 13 may include a radar device configured to generate radar data as agent 10 moves through environment 8. The radar data includes coarse-grain information indicating a presence or arrangement of objects within environment 8. Radar pre-processor 40A may receive the radar data from PPE 13 and generate information related to translation and/or rotation using the radar data. For example, the radar device may be oriented toward the ground or other object at a known angle, such as may be determined by inertial data. Radar pre-processor 40A may determine a shift in frequency based on a relative velocity between agent 10 and the ground or other object and determine a relative position of agent 10 from the relative velocity. As another example, radar pre-processor 40A may analyze successive radar scans to determine a change in rotation, such as by using an iterative closest point algorithm. Radar pre-processor 40A may store the radar data in sensor datastore 48A, and may further create, update, and/or delete information stored in sensor datastore 48A.

In some examples, radar pre-processor 40A may be configured to process radar data into a form usable for identifying one or more features within environment 8. For example, radar pre-processor 40A may generate a point cloud or other reference framework for one or more objects (e.g., a wall) in environment 8 using the radar data. As described above, while radar may provide relatively low resolution special information regarding environment 8, radar may be capable of transmitting through smoke or other visually obscuring medium, such that radar data may be used to determine a presence or arrangement of one or more objects in environment 8, as will be explained further below.

In some cases, services 40 may include an inertial pre-processor 40B configured to process inertial data into a form usable for determining pose and/or feature information. For example, PPE 13 may include an inertial measurement device configured to generate inertial data as agent 10 moves through environment 8. The inertial data includes acceleration and/or angular velocity along multiple axes and/or changes in magnetic field to indicate information related to translation and/or rotation, respectively. Inertial pre-processor 40B may receive inertial data from PPE 13 and generate information related to translation and rotation using the inertial data. Inertial pre-processor 40B may store the inertial data in sensor datastore 48A, and may further create, update, and/or delete information stored in sensor datastore 48A.

In some cases, services 40 may include a thermal image pre-processor 40C configured to process thermal image data into a form usable for determining pose and/or feature information. For example, PPE 13 may include a thermal image capture device configured to generate thermal image data as agent 10 moves through environment 8. This thermal image data may provide relatively high-resolution spatial information regarding environment 8, and may transmit through visually obscuring media that may otherwise impede collection of spatial information of environment 8. Thermal image pre-processor 40C may receive thermal image data from PPE 13 and generate a point cloud or other reference framework for one or more objects in environment 8 using the thermal image data. This point cloud may indicate boundaries of one or more thermal objects or surfaces within environment 8 which may be used to identify thermal features, as will be described with respect to feature identifier 40G below. Thermal image pre-processor 40C may store the thermal image data in sensor datastore 48A, and may further create, update, and/or delete information stored in sensor datastore 48A.

In some instances, thermal image pre-processor 40C may be configured to process thermal image data to further condition or tune the thermal image data for identification of thermal features from the thermal image data, such as will be described with respect to feature identifier 40G below. For example, thermal image data may indicate relative temperatures within environment 8. In relatively low or high temperature environments, various threshold values for displaying an intensity spectrum (e.g., color spectrum on a heat map) may be adjusted to increase a contrast within the thermal image data. As one example, in an environment with fires, thermal image pre-processor 40C may adjust a contrast such that a fire (e.g. >90° C.) may be differentiated from a hot surface (e.g., >50° C. and <90° C.) or a warm surface (e.g., <50° C.). As another example, in a victim rescue environment, thermal image pre-processor 40C may adjust a contrast such that a human (e.g., ~38° C.) may be differentiated from a radiator (e.g., ~30° C.).

In some cases, services 40 include Simultaneous Location and Mapping (SLAM) processor 40D. SLAM processor 40D may be configured to generate pose data of agent 10 based on the processed sensor data. The pose data includes a location and an orientation of agent 10 as a function of time. For example, the pose data may include spatial coordinates (e.g., X, Y, Z) and quaternion coordinates (e.g., q0, q1, q2, q3) for a given time (e.g., t). SLAM processor 40D may be configured to track the pose data of the agent as the agent moves through environment 8. In some examples, sensor data can be used to identify where agent 10 may be looking within environment 8, such as by performing SLAM for vision-aided inertial navigation (VINS). In some instances, SLAM processor 40D may use a machine-learned model, such as from analytics service 40J, to determine accurate poses. SLAM processor 40D may store pose data in pose datastore 48B, and may further create, update, and/or delete information stored in pose datastore 48B.

In some instances, SLAM processor 40D may be configured to evaluate a relative accuracy of one or more types of sensor data, such as inertial data and radar data, using graduated transformations based on confidence of the data. Sensor data collected by sensors of PPE 13, such as radar data, inertial data, and thermal image data, may have an associated confidence level that accounts for an accuracy, likelihood, or noisiness of the data. For example, as agent 10 moves through environment 8, translation information indicated by inertial data may be subject to drift, such that the inertial data becomes less accurate over a distance or time traveled from a high confidence point (e.g., an entryway determined by GPS or network data). SLAM processor 40D may be configured to generate pose data based on a relative weighting between radar data and inertial data. In some examples, SLAM processor 40D may be configured to generate pose data related to orientation of agent 10 using inertial data and generate pose data related to translation of agent 10 using radar data. SLAM processor 40D may be configured to change the relative weighting between the inertial data and the radar data based on at least one of a distance or a time of movement of agent 10 through environment 8, such as from a known location or a known orientation. For example, SLAM processor 40D may be configured to generate pose data related to orientation and translation of agent 10 using inertial data while agent 10 is relatively close to a known reference point and generate pose data related to translation of agent 10 using radar data while agent 10 is relatively distant to the know reference point. The relative weighting may be based on at least one of a time confidence, an X,Y-confidence, a Z-confidence, a yaw orientation confidence, a roll orientation confidence, or a pitch orientation confidence.

As described above, pose data may provide information regarding a location and orientation of agent 10. However, such pose data may provide relatively limited information about the environment. For example, when the pose data of one agent conflicts with pose data of another agent, the pose data itself may not include sufficient information to determine whether either agent's pose data should supersede the other agent's pose data. To provide further information about the environment of an agent, PPENS 6 may include various components or modules for generating pose metadata that identifies one or more features of the environment or an agent's movement through the environment and/or one or more confidences associated with the pose data or feature information.

In some cases, services 40 include a feature identifier 40G to identify one or more features in environment 8 using sensor data (e.g., radar data, inertial data, thermal image data), pose data, audio data (e.g., verbal reports), and other data that may indicate features about environment 8 and/or movement of agent 10 through environment 8. In addition to providing path-based information for use as pose data (e.g., location and orientation), sensor data, such as radar data from radar pre-processor 40A and/or thermal image data from thermal image pre-processor 40C, may provide feature-based information regarding a presence or arrangement of objects in environment 8. Feature identifier 40G may be configured to receive sensor data, pose data, and/or external data and generate pose metadata that represents one or more features of environment 8. These features may be used to further determine or refine the location and orientation of agent 10, or may be used to provide more qualitative information regarding various objects with which agent 10 may interact or avoid.

In some examples, feature identifier 40G performs in-depth processing of data streams from the set of sensor data processors representing a field of view of agent 10. Feature identifier 40G may perform this in-depth processing in real-time to provide real-time alerting and/or reporting to agent 10 and/or other users of the pose data and metadata. Such in-depth processing may enable feature identifier 40G to determine hazardous and nonhazardous thermal events, landmarks, and objects. For example, radar data from radar pre-processor 40A and/or thermal image data from thermal image pre-processor 40C may include a point cloud or other reference framework for identifying spatial or feature characteristics of objects in the environment. Feature identifier 40G may be configured to detect conditions in the streams of data, such as by processing the streams of sensor data in accordance with one or more feature models, as will be described further below. Feature identifier 40G may use one or more models that provide statistical assessments of the likelihood of an event in the field of view or the relevant information determined by the set of sensor data processors. Feature identifier 40G may include a decision support system that provides techniques for processing data to generate assertions in the form of statistics, conclusions, and/or recommendations. For example, feature identifier 40G may train and apply historical data and/or models stored in feature datastores 48E-48I and/or analytics datastore 48L to determine the relevant information processed by the sensor data processors.

In some examples, feature identifier 40G may be configured to generate pose metadata that represents one or more features of environment 8, or agent 10 in environment 8, based on one or more verbal reports. For example, PPE 13 may include an audio capture device, such as a microphone, configured to receive active or passive audio data that provides a description of one or more features. In some examples, feature identifier 40G may identify one or more features based on active audio data provided by agent 10. For example, agent 10 may verbally provide a description of one or more features in environment 8 (e.g., "window to my left") or movement of agent 10 through environment 8 (e.g., "crouching"). In some examples, feature identifier may identify one or more features based on passive audio data, such as ambient sound indicating one or more features of environment 8, a location within environment 8, or presence of other agents 10 in environment 8. In these various ways, feature identifier 40G may supplement radar, inertial, thermal image data, and/or other sensor data with qualitative and contextual information about environment 8 that may be more easily and/or accurately captured by agent 10.

In some examples, feature identifier 40G may be configured to generate pose metadata that represents one or more motion features corresponding to movement of agent 10 through environment 8. Motion features may include any combination of poses or movements of agent 10 as agent 10 moves through environment 8, such as may be perceived by agent 10. Agent 10 may move through environment 8 using movements that can be characterized as a series of poses based on the pose data. In some instances, these motion features may provide additional information as to how agent 10 is moving through environment 8. For example, a change in pace and height of agent 10 may indicate a crouched or crawling motion of agent 10, such as may be associated with a hazard in the environment. In some instances, these motion features may provide higher confidence information as to how agent 10 is moving through environment 8. For example, most buildings may include structural features, such as hallways and walls, that are oriented at square angles, such that agent 10 may typically move in directional increments of 90 degrees (e.g., right turn, left turn, straight forwards, straight backwards). As a result, these motion features may be determined with relatively high certainty compared to a tracked location and/or orientation.

Feature identifier 40G may be configured to identify a series of poses based on the sensor data and/or pose data and determine a motion feature based on the series of poses. Motion models corresponding to various motion features may be stored in motion datastore 48E, such that feature identifier 40G may receive sensor data and/or pose data and identify one or more motion features using the motion models from motion datastore 48E. For example, feature identifier 40G may receive radar data indicating a horizontal translation (e.g., velocity) of agent 10 and inertial data indicating a rotation or vertical translation of agent 10, and use one or more motion models to classify the series of poses indicated by the radar and inertial data. The motion feature may include at least one of a change in location or orientation of the agent or a motion type of the agent. For example, a change in location or orientation may be a turn, while a change in motion type may be a crawl or sidestep. Various example motion features are presented in Table 1 below.

TABLE 1

| Motion Feature | Example Data |
|---|---|
| Turn | Inertial data (e.g., angular velocity), radar data (e.g., velocity) |
| Special turn (90-degree turn, U-turn) | Inertial data, radar data |
| Straight motion (forward/backward) | Inertial data, radar data |

TABLE 1-continued

| Motion Feature | Example Data |
|---|---|
| Motion type (upright, prone, sidestep) | Inertial data, radar data, audio data (e.g., verbal report) |

In some examples, the one or more features may include one or more spatial features corresponding to a relative position of objects in environment 8. Spatial features may include a presence or arrangement of objects in environment 8, such as may be perceived with respect to agent 10. Feature identifier 40G may be configured to determine a spatial feature using radar data, such that the spatial features may be identified in a visually obscured environment. For example, radar data may provide information about a relative velocity (and therefore relative distance) between agent 10 and an object and/or between two or more objects as agent 10 moves through environment 8. This relative distance information may be used to determine the presence or arrangement of one or more objects in environment 8, such as a distance of an object from agent 10, a distance between two or more objects, a presence or absence of an object, and/or an amount of space around agent 10.

In some instances, this spatial information may provide agent 10 with enough information to continue moving through environment 8. For example, agent 10 may be moving through a space having low visibility. The radar data may indicate the presence of walls to the left and right of agent 10 and the lack of walls straight ahead, such that agent 10 may continue to move forward. In some instances, this spatial information may provide more qualitative information about the space around agent 10. For example, the radar data may indicate a relative distance between the walls of six feet, indicating a hallway.

Feature identifier 40G may be configured to identify a relative position of objects based on the sensor data and/or pose data and determine a spatial feature based on the relative position of the objects. Spatial models corresponding to various spatial features may be stored in spatial datastore 48F, such that feature identifier 40G may receive sensor data and/or pose data and identify one or more spatial features using the spatial models from spatial datastore 48F. For example, feature identifier 40G may receive radar data indicating relative position between two objects and use one or more spatial models to identify one or more boundaries of the objects in the environment, such that feature identifier 40G may identify relative distances to and/or between boundaries of objects. Various example spatial features are presented in Table 2 below.

TABLE 2

| Spatial Feature | Example Data |
|---|---|
| Presence of wall on side (left/right) | Radar data (e.g., detected objects inferred as wall), audio data (e.g., verbal report), motion metadata (e.g., straight line motion characteristic of hand-on-wall) |
| Distance to wall on side | Radar data |
| Width between walls on side or open space to right/left (>threshold) | Radar data |
| Presence of wall in front/behind | Radar data, audio data, motion metadata |
| Distance to wall in front/behind | Radar data |
| Distance in front/behind or open space in front/back (>threshold) | Radar data |

TABLE 2-continued

| Spatial Feature | Example Data |
| --- | --- |
| Wall/ceiling above | Inertial data (e.g., pitch), radar data (e.g., detected objects inferred as ceiling) |
| Height of space | Radar data |
| Area of space | Distance metadata (e.g., width between walls and distance in front/back) |
| Volume of space | Distance metadata (e.g., height of ceiling and area of space) |
| Concave/convex shape of feature | Radar data |
| In hallway | Radar data, distance metadata (e.g., presence or and width between walls) |
| Boundary or inflection point | Radar data |
| Doorway | Radar data, boundary metadata |

In some examples, the one or more features may include one or more team features corresponding to one or more agents in the environment. Team features may include any features related to a person (e.g., another agent) or a piece of equipment (e.g., a hose) in a task-based relationship with agent 10. In some instances, team features may include an identity of an agent or piece of equipment. For example, a wireless signal associated with a particular agent or a fiducial marker associated with a type of equipment may indicate the identity of the agent or equipment. In some instances, team features may include a relationship of team members indicating a particular task. For example, an arrangement of agents and/or a presence of a piece of equipment may indicate that the agents are performing a particular operation or are at a particular step in a process.

Feature identifier 40G may be configured to identify a signal or object based on the sensor data, pose data, and/or other data and determine a team feature based on the signal or object. Team models corresponding to various team features may be stored in team datastore 48G, such that feature identifier 40G may receive sensor data, pose data, and/or other data and identify one or more team features using the team models from team datastore 48G. For example, feature identifier 40G may receive wireless data indicating the presence two agents in the environment and radar data indicating relative position between two objects in the environment and use one or more team models to identify the two objects as two particular agents (e.g., by using a database) and determine a relative position between the two agents as indicating operation of a fire hose. Team models corresponding to various team features may be stored in team datastore 48G, such that feature identifier 40G may receive sensor data, pose data, audio data, and/or network data and identify one or more team features using the team models from team datastore 48G. Various example team features are illustrated in Table 3 below.

TABLE 3

| Team Feature | Example Data |
| --- | --- |
| Agent to left/right/ahead/behind | Radar data (e.g., velocity), network metadata (e.g., beacons 17 or network 4), fiducial data, audio data (e.g., verbal report) |
| Equipment (e.g., hose) | Motion metadata (e.g., agent motion indicating operation), arrangement of agents |

In some examples, the one or more features may include one or more landmark features corresponding to one or more objects in the environment. Landmark features may include any of an object, a door, a window, a sign, a fiducial, an entry, an exit, a stairway, or a room status. In some instances, landmark features may include one or more objects that provide a reference for agent 10. For example, a particular landmark feature, such as a window, may be associated with a particular location in an environment or a relative location to another agent in the environment. In some instances, landmark features may include one or more objects that provide information as to a navigation structure for agent 10. For example, the same window mentioned above may be associated with an emergency escape or a passage for directing a piece of equipment into the environment.

Feature identifier 40G may be configured to identify one or more objects in the environment based on the sensor data and/or pose data and determine a landmark feature based on characteristics of the one or more objects. Landmark models corresponding to various landmark features may be stored in landmark datastore 48H, such that feature identifier 40G may receive sensor data and/or pose data and identify one or more landmark features using the landmark models from landmark datastore 48H. For example, feature identifier 40G may receive radar data indicating a presence of an object and use one or more landmark models to identify the objects in the environment. In some instances, sensor data, such as radar data, may include a point cloud or other reference framework that indicates relative boundaries between objects in the environment. Feature identifier 40G may compare sensor data to landmark data to identify the objects in environment, such as walls, furniture, other agents 10, or the like. Various example landmark features are illustrated in Table 4 below.

TABLE 4

| Landmark Feature | Example Data |
| --- | --- |
| Exit | Map data (e.g., pre-planning walkthrough), fiducial data, audio data (e.g., verbal report), spatial metadata |
| Interior door | Map data, audio data, spatial metadata, radar data |
| Stairway | Inertial data, map data, audio data, spatial metadata, motion metadata, radar data |
| Window | Map data, audio data, radar data (e.g., shape) |
| Keep out (avoid location) | Audio data, hazard data |
| Keep out reason | Audio data, hazard data |
| Clear of victims | Audio data |

In some examples, the one or more features may include one or more thermal features corresponding to one or more thermal properties of the environment. PPE 13 may include a thermal image capture device configured to generate thermal image data and, optionally, a temperature sensor configured to generate temperature data. As agent 10 moves through environment 8, agent 10 may encounter various thermal features that include surfaces, objects, or volumes having thermal properties, such as fires, hot spots, hot surfaces, cold spots, cold surfaces, smoke, layers of varying temperatures, and static objects (e.g., doorway).

Feature identifier 40G may be configured to identify, based on the thermal image data, a thermal feature. Thermal models corresponding to various thermal features may be stored in thermal datastore 48I, such that feature identifier 40G may receive sensor data, pose data, and/or audio data, and identify one or more thermal features using the thermal models from thermal datastore 48I. In some examples, feature identifier 40G may be configured to identify a thermal feature using other types of sensor data. For example, to identify smoke, feature identifier 40G may use thermal image data and visible image data to determine a difference between the thermal image data and visible image data. Various example team features are illustrated in Table 5 below.

TABLE 5

| Pose Metadata | Example Data |
| --- | --- |
| Fire | Thermal image data (e.g., intensity or shape), temperature data, audio data, |
| Smoke | Thermal image data, audio data, visual image data |
| Flashover | Thermal image data, audio data |
| Hot surface (e.g., object) | Thermal image data, landmark metadata |

In some examples, feature identifier 40G may be configured to identify a temporal signature of the thermal image data. The temporal signature indicates a change in temperature of the one or more thermal features over time. In some examples, feature identifier 40G may be configured to identify a spatial signature of the thermal image data. Feature identifier 40G may be configured to classify one or more thermal features of the environment based on the thermal image data. The one or more thermal features comprise at least one of a temperature, a fire, a presence of smoke, a hot surface, a presence of hot air, or a presence of layers of varying temperatures.

In some examples, feature identifier 40G may be configured to classify one or more thermal features using information from other agents. For example, feature identifier 40G may receive a first set of thermal image data from a first agent 10A, such as from thermal image pre-processor 40C, and receive a second set of thermal image data from a second agent 10B, such through wireless transmission, and classify the one or more thermal features of the environment based on the first and second thermal image data. The first and second sets of thermal image data may represent different aspects of the thermal features, such portions of the thermal features that may be obscured or difficult to capture from a single thermal image capture device.

In some cases, feature identifier 40G may be configured to determine a hazard level for the one or more thermal features. Feature identifier 40G may be configured to determine that the hazard level of the one or more thermal features meets a hazard threshold. Hazard models and databases corresponding to various hazard levels may be stored in hazard level database 48J, such that feature identifier 40G may receive sensor data and/or pose data indicating one or more thermal features, and identify one or more hazard levels using the hazard models and/or databases from hazard level datastore 48J.

In some cases, feature identifier 40G may be configured to determine a location of the agent based on the temperature data for the environment and known temperatures of the environment. In addition, or alternative to a thermal image capture device, PPE 13 may include a temperature sensor configured to generate temperature data, such as a temperature of an ambient environment around agent 10. Various locations or features within an environment may have different temperatures than other locations or features within the environment, such that the location of agent 10 may be differentiated based at least partly on the temperature. For example, the one or more thermal features of the environment may correspond to a landmark feature of the environment, such as a floor with a fire. Feature identifier 40G may be configured to determine a location of the agent based on the one or more thermal features, such as by looking up a location of the landmark feature in a landmark database or the temperature of the environment in a landmark database, such as may be stored in landmark datastore 48H and/or thermal datastore 48I.

Feature identifier 40G may be configured to predict a future thermal event based on the one or more thermal features. These thermal features, alone or in combination with other indicators, may indicate various potential thermal events, such as flashovers or flare-ups. These potential thermal events may not be readily detected by agent 10. For example, agent 10 may not know what properties to look for, or may not have access to information (e.g., thermal properties) that would indicate the thermal events. Feature identifier 40G may be configured to receive sensor data, such as thermal image data and/or temperature data and use thermal models from thermal datastore 48I to predict the thermal event.

In some examples, the pose metadata further includes one or more confidence scores corresponding to the one or more features of the environment. The one or more confidence scores represent a likelihood of the one or more features being accurately identified. For example, feature identifier may be relatively aware of an accuracy associated certain types of data or models, or of assumptions used to identify one or more features. As will be described further below, these confidences may be used to reconcile the pose data and metadata with later-captures pose data or metadata of the same agent, or pose data and metadata of other agents. Various example confidence scores are illustrated in Table 7 below.

TABLE 7

| Confidence Metadata | Example Data |
| --- | --- |
| Time confidence | Pose data (e.g., time since and/or confidence of last known reference), network data (e.g., time since last network interaction) |
| X, Y confidence | Pose data (e.g., time since, distance from, and/or confidence of last known reference) |
| Z confidence | Pose data (e.g., time since and/or confidence of last known reference) |
| Yaw orientation confidence | Pose data |
| Pitch, roll orientation confidence | Pose data |

In some cases, services 40 include a fiducial identifier 40H to identify one or more fiducial markers in environment 8 using sensor data (e.g., radar data, inertial data, thermal image data), pose data, audio data (e.g., verbal reports), and other data that may indicate one or more fiducial markers 21 within environment 8. In a visually obscured environment, feature identifier 40G may not readily identify one or more features within the environment, such as due to limited time, processing power, visibility. For example, landmark features and/or team features may be obscured by smoke. To aid in identifying features within the environment, the environment may include one or more fiducial markers 21.

Fiducial identifier 40H may be configured to receive sensor data and identify one or more fiducial markers captured in the sensor data. PPE 13 may include one or more sensors configured to generate sensor data that includes an indication of fiducial marker 21 in the visually obscured environment. Fiducial identifier 40H may be configured to process the sensor data to extract fiducial data from the indication of the fiducial marker. In some instances, the indication of fiducial marker 21 may include a code stored or embodied on fiducial marker 21. For example, to differentiate fiducial marker 21 from other markings or objects in an environment, fiducial marker 21 may include a pattern or other code that is capable of being recognized. Fiducial identifier 40H may be configured to process the pattern to extract the code from the pattern. For example, fiducial identifier 40H may orient the pattern based on one or more reference elements in the pattern and extract fiducial data based on one or more data elements in the pattern. In some instances, fiducial identifier 40H may look-up the code indicated by the data elements and extract fiducial data regarding fiducial marker 21, such as from fiducial datastore 48K.

In some instances, fiducial marker 21 may include a reflective surface configured to reflect electromagnetic radiation corresponding to a pattern, such as an emissive surface. Fiducial identifier 40H may be configured to detect a pattern or level of emissivity in the emissive surface based on sensor data, such as thermal image data or radar data. For example, the reflective surface may be configured to reflect infrared radiation, such that a thermal image capture device may generate thermal image data from the reflected infrared light. As another example, the reflective surface may be configured to reflect radio waves or microwaves, such that a radar device may generate radar data from the reflected radio waves or microwaves. In some instances, fiducial marker 21 may be configured to emit a wireless signal that includes the fiducial data, such that a wireless antenna may detect the wireless signal based on a relative proximity to fiducial marker 21.

In some instances, fiducial identifier 40H may include one or more states of operation based on a capability of various sensors to detect one or more objects in the environment. For example, fiducial identifier 40H may be configured to operate at least one of a radar device or a thermal image capture device in response to determining that a visible image capture device may not capture the visible or infrared light. Fiducial identifier 40H may be configured to indicate a change in the relative weighting between two or more types of sensor data based on at least one of a distance or a time of movement of the agent from fiducial marker 21.

In some examples, feature identifier 40G may be configured to identify one or more landmark features based on the fiducial marker. For example, fiducial marker 21 may be placed at a location in the environment prior to agent 10 encountering fiducial marker 21. Fiducial marker 21 may be associated with a particular location within the environment. For example, prior to agent 10 entering the environment, another agent may place or position an indicator associating fiducial marker 21 with the particular location in the environment, such as in fiducial datastore 48K. In other example, the same or another agent may store the indicator during an emergency situation, such as by placing fiducial marker 21 at a location to identify the location as being previously encountered. Feature identifier 40G may be configured to determine a position of the agent based on the one or more landmark features.

While feature identifier 40G has been described with respect to using radar data, thermal image data, and fiducial data to identify features, other types of sensor data, or even other data, may be used. In some examples, feature identifier 40G may use audio data to identify one or more features in the environment, such that the pose metadata represents one or more features identified by an audible command by one or more agents. For example, PPE 13 may include an audio capture device, such as a microphone, configured to generate audio data. This audio data may include information regarding one or more features in the environment. In some instances, the audio data may include actively-provided information about the environment, such as provided by agent 10. For example, agent 10 may provide a description about one or more features of the environment. Feature identifier 40G, or an audio pre-processor (not shown), may process the audio data to identify one or more features described by agent 10. In some cases, agent 10 may further provide context for associating confidence score with the description, such as will be described further below. In some instances, the audio data may include passively-provided information about the environment, such as captured from ambient sounds while agent 10 is passing through the environment.

In some cases, services 40 include map builder 40E to build a map of environment 8 using pose data (e.g., associated with a position and orientation of agent 10) and/or metadata (e.g., associated with one or more features of agent 10 or environment 8 and/or confidences for poses or features). For example, map builder 40E may receive pose data from SLAM processor 40D and/or other agents 10, and/or pose metadata from feature identifier 40G, fiducial identifier 40H, and/or other agents 10, and use the received pose data and/or pose metadata to generate map data corresponding to a map of environment 8. In some instances, map builder 40E is configured to build, using the radar data, a map of the visually obscured environment. For example, map builder 40E may use the radar data to determine the presence or arrangement of objects within the visually obscured environment based on the radar data. Map builder 40E may store map data in map datastore 48C. Map builder 40E may further create, update, and/or delete information stored in map datastore 48C.

In some instances, map builder 40E may be configured to generate a consolidated map based on pose data and/or metadata from one or more agents. Map builder 40E may receive a first set of pose data or metadata from SLAM processor 40D, feature identifier 40G, and/or fiducial identifier 40H, receive a second set of pose data and/or metadata for a second agent, such as wirelessly in a prioritized order and/or generated during a walkthrough of the environment. Map builder 40E may generate map data of the environment based on the first and second sets of pose data and/or metadata. For example, the first set of pose data and/or metadata may represent a first set of features in the environment, while the second set of pose data and/or metadata may represent a second set of one or more features in the environment. Map builder 40E may consolidate the first and second sets of pose data and/or metadata to provide a more comprehensive (e.g., by adding features) or accurate (e.g., by reconciling conflicting features) map of the environment. For example, map builder 40E may be configured to determine corresponding features between the first set of one or more features and the second set of one or more features. As another example, map builder 40E may be configured to correct a difference between the corresponding features by translating, scaling, or rotating a subset of the corresponding features.

Map builder 40E may be configured to generate the map data based on a relative weighting between a first set of confidence values representing a likelihood of the first set of one or more features and a second set of confidence values representing a likelihood of the second set of one or more features. For example, the pose metadata may include confidence values for one or more poses and/or one or more features within the environment, as described with respect to feature identifier 40G above. Map builder 40E may evaluate the relative confidence values and generate a consolidated map based on the relative confidence values. For example, map builder 40E may combine some features (e.g., based on a degree of confidence) and/or supersede other features (e.g., based on a binary confidence being higher).

Map builder 40E may be configured to identify, using features derived from radar data, an obscuration between the first agent and the second agent. For example, two sets of pose data and/or metadata may indicate that two agents on seemingly unobscured paths are separated by one or more features, such as a wall or a fire. Map builder 40E may determine the existence of the obscuration based on the relative poses or features identified in the respective pose data and/or metadata from the agents. For example, map builder 40E may identify the wall between the two agents due to an identified separation and/or a lack of common features at a particular point that could be overlapping. Map builder 40E may periodically refresh the construction of the map to account for new information.

Map builder 40E may determine additional information about environment 8 to provide to the display. Map builder 40E may generate one or more indicator images related to the information relevant to the field of view of agent 10. In some examples, indicator images label landmarks in the map with characteristics, such as a room empty of other people or the presence of a potential hazard in a stairwell. In other examples, indicator images may communicate to agent 10 an explanation for a route recommended by route builder 40F (e.g., to avoid a thermal event whose hazard level score meets a hazard threshold).

As examples, the one or more indicator images may include a symbol (e.g., a hazard sign, a check mark, an X, an exclamation point, an arrow, or another symbol), a notification or alert, an information box, a status indicator, a ranking or severity indicator, or the like. Map builder 40E may read information from map datastore 48C to generate the indicator images or otherwise generate the commands for causing the display of the indicator images. The indicator images may be configured to direct attention of agent 10 to or provide information about an object within the field of view. For example, the indicator images may be configured to highlight a potential hazard, an emergency exit, a piece of equipment, or the like.

In some examples, map builder 40E may also generate, or cause to be generated, animated or dynamic indicator images. For example, map builder 40E may generate flashing, color-changing, moving, or indicator images that are animated or dynamic in other ways. In some cases, a ranking, priority, or severity of information to be indicated by an indicator image may be factored into the generation of the indicator image. For instance, if feature identifier 40G determines that a first hazardous event within the field of view is more severe than a second safety event within the field of view, map builder 40E may generate a first indicator image that is configured to draw more attention to the first thermal event than the indicator image for the second thermal event (e.g., a flashing indicator image in comparison to a static indicator image).

In some examples, map builder 40E may use fiducial data to generate a map. For example, map builder 40E may receive first and second pose data and fiducial data of a first and second agent, respectively, and determine whether the first fiducial data matches the second fiducial data. In response to determining that the first fiducial data matches the second fiducial data, map builder 40E may generate map data based on the first and second pose data. In some examples, map builder 40E may generate the map data by aligning the one or more features, such as landmark features, based on the first fiducial data and the second fiducial data. Map builder 40E may determine, based on the one or more landmark features, that a space between the agent and the one or more landmark features is unobscured.

Further description of map builder 40E will be provided with respect to FIGS. 6-11 below. In some cases, services 40 include route builder 40F to build a route for agent 10 through environment 8 using pose data (e.g., associated with a position and orientation of agent 10) and/or metadata (e.g., associated with one or more features of agent 10 or environment 8 and/or confidences for poses or features).

For example, route builder 40F may determine a route agent 10 from a past, present, or future location to a destination. Route builder 40F may determine a route from data and/or model in map datastore 48C. In some examples, route models may include models that account for a shortest distance (e.g., a shortest distance between a present location and a destination), a safest route (e.g., a route that avoids known or potential hazards), a known route (e.g., a previous route travelled by agent 10 or another agent), a common route (e.g., a route that may be traversed with one or more other agents), and other factors that may influence a safety or utility of agent 10. For example, route builder 40F may use a route model to generates a route to a closest exit. As another example, in response to identifying one or more thermal features, route builder 40F may use a route model to generate a new route that follows stored paths and avoids stored obstacles and thermal events with respective hazard level scores that meet a hazard level threshold. Route builder 40F may periodically refresh the construction of the route to account for new information, such as a new location of agent 10. Route builder 40F may store map data in route datastore 48D. Route builder 40F may further create, update, and/or delete information stored in route datastore 48D.

Further operation of route builder 40F will be described with respect to FIGS. 6-11 below.

In some cases, services 40 include notification service 40I to process and generate various notifications to agent 10, such as notifications relating to hazards. For example, notification 40I may receive sensor, pose, or map data related to individual agents, populations or sample sets of agents, and/or environments 8 that indicate one or more directions, hazards, or other information of interest, and generate notifications. In response, notification service 40I generate alerts, instructions, warnings or other similar messages to be output to PPEs 13, hubs 14, or devices used by users 20, 24.

In some cases, services 40 includes analytics service 40J to update and maintain various feature models, such as models of motion feature datastore 48E, spatial feature datastore 48F, team feature datastore 48G, landmark feature datastore 48H, or thermal feature datastore 48I, such that feature identifier 40G may more accurately identify one or more features of an environment. Analytics service 40H may use in-depth processing to update various models based on new data. For example, although other technologies can be used, analytics service 40J may utilize machine learning when processing data in depth. That is, analytics service 40J may include executable code generated by application of machine learning to identify rules or patterns regarding various features in an environment. As a result, feature identifier 40G described above may subsequently apply the updated model to data generated by or received by PPE 13 for detecting similar patterns using feature identifier 40G. Analytics service 40J may update the models based on data received from radar pre-processor 40A, inertial pre-processor 40B, thermal image pre-processor 40C, and SLAM processor 40D, and/or any other component of PPENS 6 (including other agents 10), and may store the updated models in any of motion feature datastore 48E, spatial feature datastore 48F, team feature datastore 48G, landmark feature datastore 48H, or thermal feature datastore 48I, for use by feature identifier 40G.

Analytics service 40H may also update the models based on statistical analysis performed, such as the calculation of confidence intervals, and may store the updated models in any of motion feature datastore 48E, spatial feature datastore 48F, team feature datastore 48G, landmark feature datastore 48H, or thermal feature datastore 48I. Example machine learning techniques that may be employed to generate models can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms, or the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbor (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, Least-Angle Regression (LARS), Principal Component Analysis (PCA), and/or Principal Component Regression (PCR). Such machine learning algorithms and/or models may be stored in analytics datastore 48L.

In general, while certain techniques or functions are described herein as being performed by certain components or modules, it should be understood that the techniques of this disclosure are not limited in this way. That is, certain techniques described herein may be performed by one or more of the components or modules of the described systems. Determinations regarding which components are responsible for performing techniques may be based, for example, on processing costs, financial costs, power consumption, or the like.

In general, while certain techniques or functions are described herein as being performed by certain components (e.g., PPENS 6, PPE 13), it should be understood that the techniques of this disclosure are not limited in this way. That is, certain techniques described herein may be performed by one or more of the components of the described systems. For example, in some instances, PPE 13 may have a relatively limited sensor set and/or processing power. In such instances, one of communication hub 14 and/or PPENS 6 may be responsible for most or all of the processing of data, identifying the field of view and relevant information, or the like. In other examples, PPE 13 and/or communication hub 14 may have additional sensors, additional processing power, and/or additional memory, allowing for PPE 13 and/or communication hub 14 to perform additional techniques. In other examples, other components of system 2 may be configured to perform any of the techniques described herein. For example, beacons 17, communication hubs 14, a mobile device, another computing device, or the like may additionally or alternatively perform one or more of the techniques of the disclosure. Determinations regarding which components are responsible for performing techniques may be based, for example, on processing costs, financial costs, power consumption, or the like.

Figure 3:
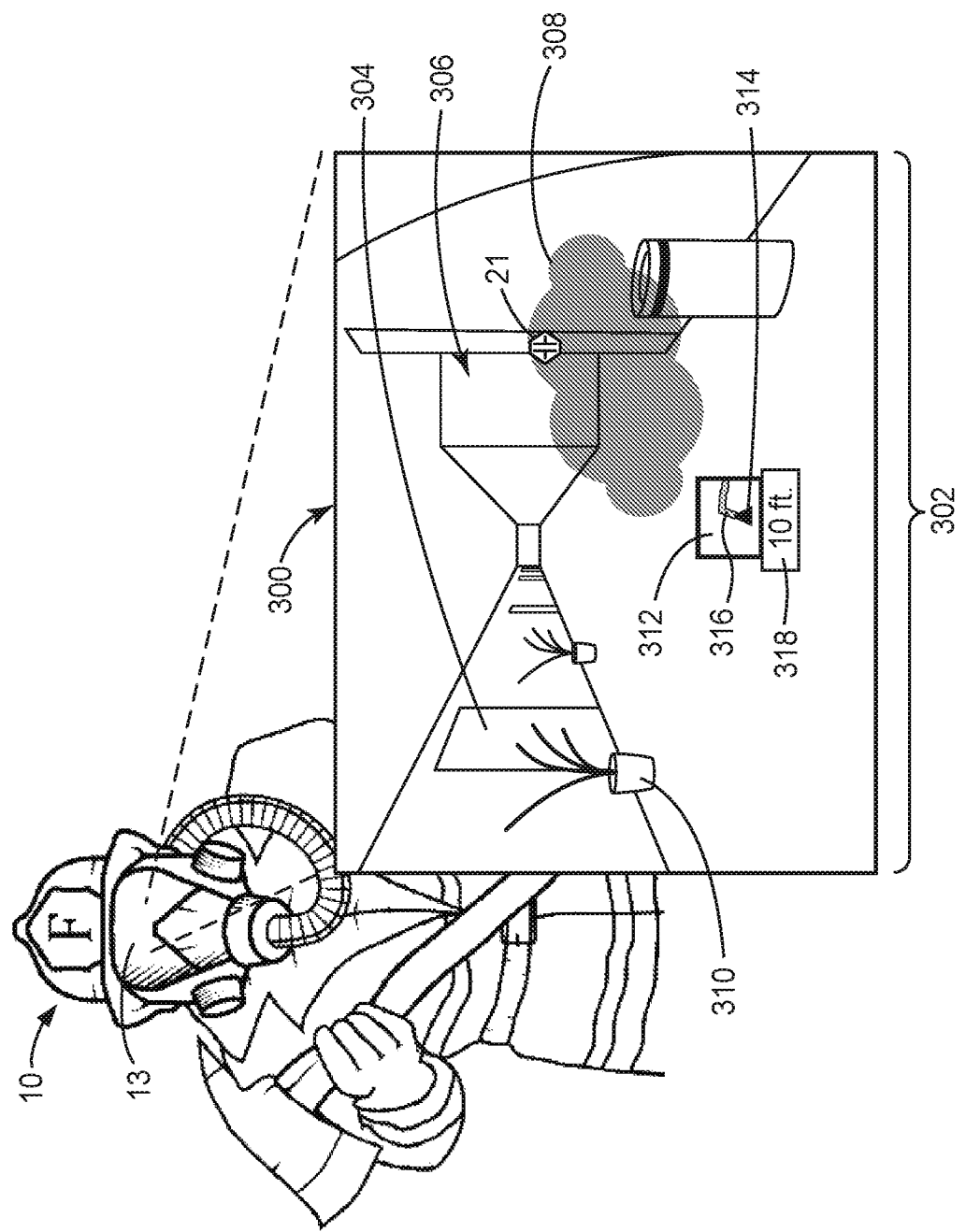
FIG. 3 is a conceptual diagram illustrating an example display in communication with PPENS that includes a field of view as seen through an article of PPE worn by an agent in a visually obscured environment, in accordance with one aspect of the present disclosure.

FIG. 3 is a conceptual diagram illustrating example view 300 constructed by PPENS 6 and/or PPE 13 for render through a display device of PPE 13 of agent 10, where view 300 includes field of view 302 and a virtual map 312, in accordance with various techniques of this disclosure. Agent 10 may be within a hazardous environment (e.g., environment 8B) and wearing PPE 13 having one or more sensors (e.g., sensors of a sensor assembly in PPE 13) and an integrated or otherwise connected display device. As described, environment 8 (FIG. 1) may be of low visibility and/or visual obscuration to agent 10, such as due to darkness or smoke 308, and may include a variety of objects (e.g., plant 310, etc.), landmarks (e.g., wall 306, fiducial marker 21, etc.), and/or potential hazards. Map 312 may provide a digital representation of environment 8 including objects, landmarks, potential hazards, a path that agent 10 has traversed, and/or a guidance route 316 to a destination.

In some examples, agent 10 sees the actual, physical environment 8 through field of view 302 of the display device, and may see the physical features relatively clearly or partially or even fully obscured due to environmental conditions. In the example illustrated in FIG. 3, agent 10 may see a first hallway intersecting with a second hallway, enclosed by walls (e.g., wall 306) and containing one or more objects (e.g., plant 310) and fiducial marker 21. In other examples, agent 10 may not see environment 8 clearly due to low visibility, such as due to darkness or smoke 308. In such cases, PPE 13, using sensors not dependent on visual access to environment 8 (e.g., a radar device, a thermal image capture, an inertial measurement device, etc.) may construct and render, within field of view 302, a digital representation of all or portions of detected physical features of environment 8. In the example of FIG. 3, PPE 13 renders map 312 as content overlaid on the physical view through the display device. For instance, map 312 may be in the lower center of the display device. Agent 10 may have visual access to field of view 302 beyond map 312. In this example, map 312 displays visual cues providing a guidance route 316 to a known destination, such as a safe exit.

In some examples, PPE systems may enable navigation through the visually obscured environment shown in field of view 302 using radar. For example, PPENS 6 may process radar data that indicates various features of the environment, such as a presence of plant 310 or an arrangement of walls 306 corresponding to an opening, despite smoke 308 visually obscuring walls 306. PPENS 6 may generate and track pose data that includes the presence and arrangement of plant 310 and/or walls 306. PPENS 6 may also identify smoke 308 as a dynamic, rather than static, object, such that smoke 308 may not interfere with translation information obtained with reference to a floor.

In some examples, PPE systems may enable navigation through the visually obscured environment shown in field of view 302 using fiducial data. For example, PPENS 6 may receive an indication of fiducial marker 21 from radar data or thermal image data, despite fiducial marker 21 being visually obscured by smoke 308. PPENS 6 may process the radar or thermal image data to extract fiducial data from the indication of fiducial marker 21. For example, the fiducial marker 21 may indicate a particular location within the environment or may indicate an angular relationship of agent 10 with fiducial marker 21.

Map 312 may be constructed by one or more respective paths of one or more agents 10 (e.g., by map builder 40E of PPENS 6 of FIG. 2). Additional features of environment 8 may improve the accuracy of map 312. For example, known landmarks, such as fiducial marker 21, may add certainty to the accuracy of tracking. Map 312 shows a guidance route with a right turn in 10 feet, at an intersection of hallways marked by fiducial marker 21. In such a case, fiducial marker 21 may confirm the distance 318 of the turn due to a clear line of sight between fiducial marker 21 and PPE 13, as well as the respective poses of fiducial marker 21 and agent 10 (e.g., as determined by SLAM processor 40D of FIG. 2). In other examples, features of environment 8 (such as plant 310) serve as a common feature between two or more maps and contribute to the accurate combination of the maps.

In some examples, PPE systems may enable identification of thermal features in the visually obscured environment shown in field of view 302. For example, PPENS 6 may process thermal image data that indicates a relatively high temperature of smoke 308. PPENS 6 may classify smoke 308 based on the thermal image data, such as by comparing a change of temperature of smoke 308 over time or space against a thermal model corresponding to smoke.

Map 312 may alert agent 10 to a feature of environment 8B within field of view 302 of agent 10 that agent 10 may otherwise not be aware of. For example, smoke 308 may prevent agent 10 from seeing fiducial marker 21, whereas a sensor included in PPE 13 (e.g., a radar device) may help agent 10 see fiducial marker 21. As another example, when checking a room for occupants, agent 10 may be required to search carefully for occupants, whereas PPE 13 may be able to recognize quickly that no occupants are present (e.g., by a thermal imaging sensor). Thus, in some such instances, agent 10 may be able to work more efficiently and precisely due to the display device.

In some examples, the guidance route of map 312 may be based on tracks from a variety of sources included in a map. PPENS 6 may suggest an optimal route based on a shortest path and safest passage. In some examples, PPENS 6 may recognize obstacles between agent 10 and the destination and may circumvent the obstacles in the route. In such examples, obstacles may include objects (e.g., plant 310, wall 306, or the like) or a thermal event with a hazard level score that meets a threshold hazard level (e.g., a fire, a predicted explosion, or the like). In other examples, PPENS 6 may recognize fiducial marker 21 in the line of sight of agent 10 and provide detailed directions based on the orientation of agent 10 with reference to fiducial marker 21.

Map 312 may represent information through a combination of images and text. For example, in the example illustrated in FIG. 3, a triangle 314 represents the current position and orientation of agent 10, and a line 316 represents a path, while text 318 is used to presage an action point 10 feet away. Other images and text may include alerts and characteristics about field of view 302, such as a checkmark to signify a room without occupants, a flame icon to indicate a fire, a message "Flashover" to describe a specific hazard, etc. Moreover, map 312 may alert agent 10 to a feature of environment 8B not within field of view 302 of agent 10 that still affects decisions of agent 10. For instance, when agent 10 considers taking a more direct route than map 312 suggests, map 312 may show an arrow pointing towards the more direct route with, for example, a message "900° F." to alert agent 10 of a dangerous hazard blocking the more direct route. Thus, agent 10 may able to work more safely due to the display device.

Figure 4:
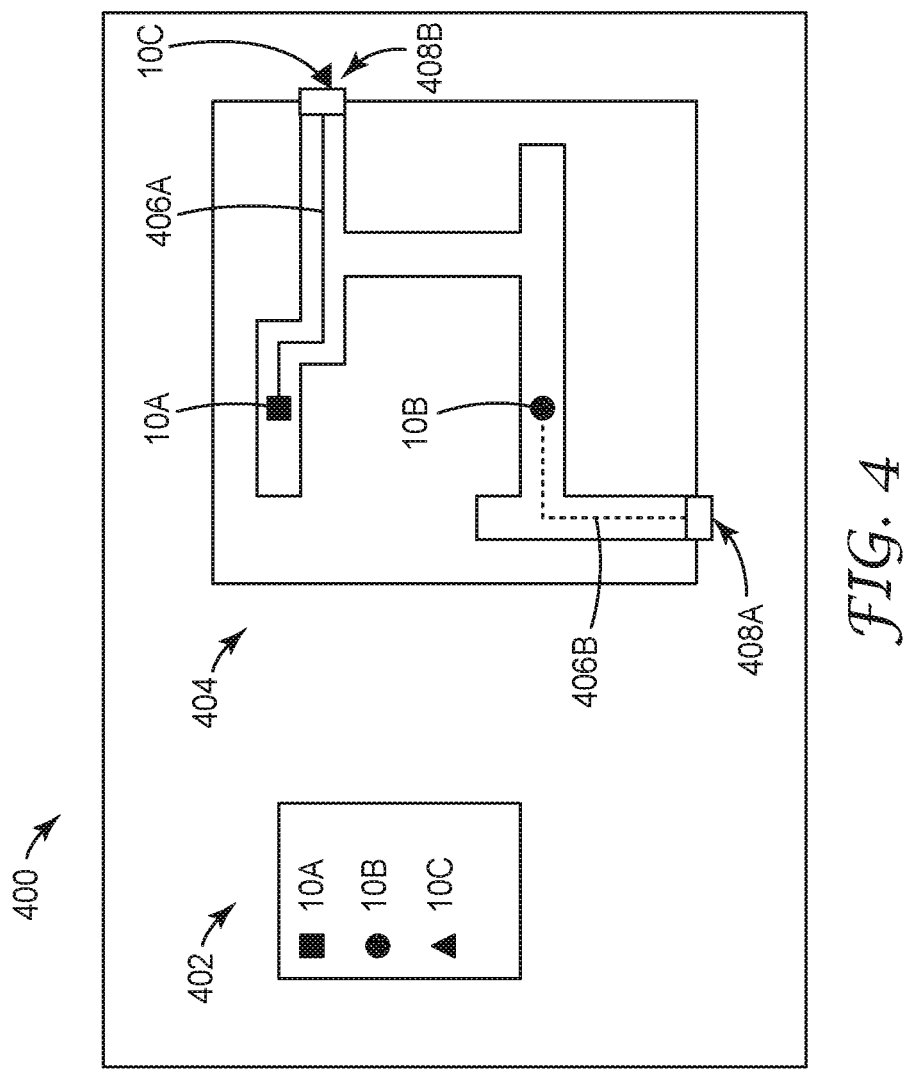
FIG. 4 is a conceptual diagram illustrating an example display in communication with a PPENS that includes a map of a hazardous environment as seen by a central command, in accordance with one aspect of the present disclosure.

While map 312 of FIG. 3 may provide local display and tracking for agent 10, in some instances, PPENS 6 may also display map information remotely, such as at a command center. FIG. 4 is a conceptual diagram illustrating example display 400 presented via a display device of a mobile station, where a computing device of the mobile station or PPENS 6 has constructed content for display 400 for rendering map 404. Map 404 shows agents 10A-C and tracks 406A and 406B (collectively, "tracks 406") of agents 10A and 10B, respectively, in a hazardous environment (e.g., environment 8B). Dashboard 402 provides additional information about agents 10.

Display 400 may be viewed at a command center of environment 8 by a supervisor of agents 10. Display 400 enables the supervisor to be aware of the locations of all agents 10, provide instructions for completing tasks by agents 10, and monitor the safety of agents 10. In some examples, display 400 may be viewed near or within environment 8B (e.g., by user 20 in environment 8A of FIG. 1). In other examples, display 400 may be viewed remotely (e.g., by remote user 24 of FIG. 1). The supervisor may view display 400 on any computing device with a display, such as a laptop, a desktop computer, a smart phone, a tablet, or the like. Map 400 shows agents 10 in locations in environment 8 determined by PPENS 6. In some examples, agents 400 have moved within environment 8, generating a series of poses shown as tracks 406.

PPENS 6 may at least partially construct map 404 from a combination of pose data of tracks 406. PPENS 6 may process data from sensors (e.g., PPE 13) carried by agents 10 or unmanned vehicles (e.g. unmanned vehicle 12 from FIG. 1) through environment 8. PPENS 6 may combine two or more of tracks 406 by comparing pose data and metadata indicating location, orientation, and corresponding features along tracks 406. For example, if two of agents 10 enter environment 8 from a certain door, the door may be a common feature between the tracks of the two agents 10 that enables PPENS 6 to combine their tracks. In another example, any point of meetup within environment 8 may be used as a common feature for PPENS 6 to join sets of tracks. In yet another example, a fiducial placed in a fixed, known location in environment 8B may be used as a common feature to join tracks once two or more PPE 13 have processed the fiducial. A set of tracks may be adjusted (e.g., by scaling, translating, or rotating) to fix inaccuracies in tracking in order to join the tracks with another set of tracks. Examples of PPENS 6 with respect to mapping will be described in FIGS. 6-11 below.

Map 404 may show any subset of agents, tracks, landmarks (e.g., walls, fiducials, etc.), or objects (e.g., desks, plants, etc.). In some examples, map 404 shows only agents 10 and tracks 406. In other examples, map 404 shows agents 10 and tracks 406 in addition to more details including windows, exits, interior doors, stairwells, potential hazards, or the like. In yet other examples, map 404 shows indicator images (e.g., a flame icon, a caution symbol, a checkmark, etc.) or text (e.g., "900° F.," "empty room," etc.) to further describe attributes of environment 8. Map 400 may show any view of environment 8. For example, map 404 may be a two-dimensional map (e.g., showing only one floor of a building at a time) or may be a three-dimensional map (e.g., showing more than one floor of a building at a time).

Dashboard 402 provides additional information describing map 404. In some examples, dashboard 402 identifies agents 10 by name and/or provides characteristics about agents 10, such as location, air supply, or time spent in environment 8. In yet other examples, dashboard 402 shows a second version of map 404, such as environment 8B from a different angle, map 404 with an increased focus on one of agents 10, or map 404 from the point of view of one of agents 10.

Figure 5:
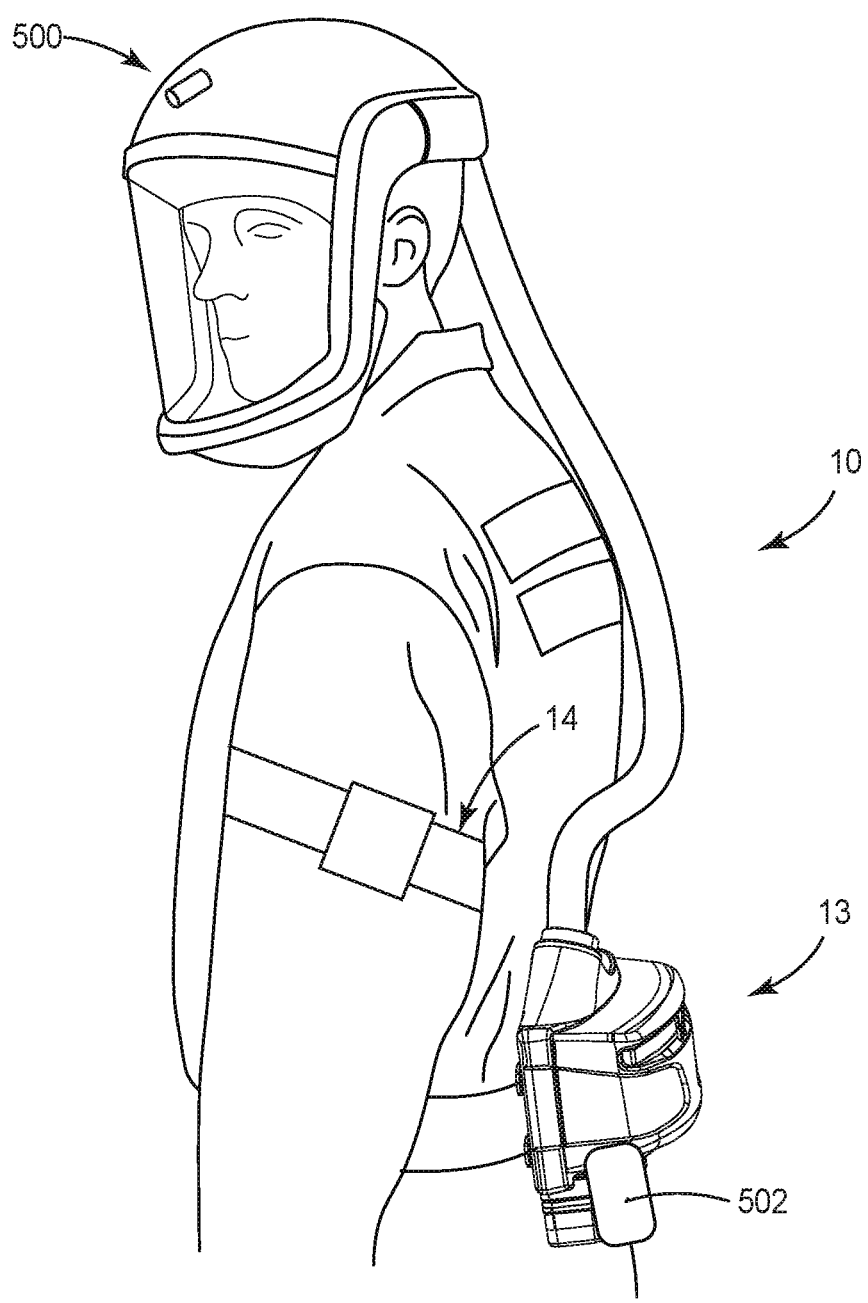
FIG. 5 is a conceptual diagram illustrating an example agent wearing one or more articles of PPE that includes a sensor assembly for collecting sensor data from a hazardous environment, in accordance with one aspect of the present disclosure.

FIG. 5 is a perspective view diagram illustrating example agent 10 wearing PPE 13 for operating in a hazardous environment (e.g., environment 8B). PPE 13 may include, for example, a self-contained breathing apparatus, an air-purifying apparatus, a backpack, etc. In the example of FIG.

5, agent 10 is wearing PPE 13 of a breathing apparatus that includes a helmet and a waist pack; however, in other examples, PPE 13 may include a backpack or other pack with a frame.

Sensor assemblies 500 and 502 may include one or more of a thermal image capture device, a radar device, an inertial measurement device, a GPS device, a lidar device, an image capture device, or any other device that may provide data regarding objects or conditions of the hazardous environment. In the example of FIG. 5, PPE 13 includes a head-mounted sensor assembly 500 on the helmet and a body-mounted sensor assembly 502 on the waist pack. In some examples, head-mounted sensor assembly 500 may include sensor devices that use a line-of-sight of objects, such as a visible image capture device, a thermal image capture device, a radar device, and the like. In some examples, head-mounted image sensor assembly 500 may include an in-mask display to present a user interface to the agent 10. In some examples, body-mounted sensor assembly 502 may include sensor devices that do not use a line-of-sight or may benefit from alignment of the body, rather than the head, of agent 10, such as an inertial measurement device, a wireless receiver, a thermometer, and the like. For example, an inertial measurement device may be mounted on the body of agent 10 to extract translational motion and decouple rotation of the inertial measurement device from head turns. PPE 13 may further include accessory systems for operating sensor assemblies 500 and 502. For example, PPE 13 may include power equipment, such as batteries, for operating sensors of PPE 13.

In the example of FIG. 5, agent 10 is wearing an arm-mounted communication hub 14. Communication hub 14 may be configured to perform one or more functions of PPENS 6 described in FIGS. 1 and 2, transmit data to a centralized computing device for performing one or more functions of PPENS 6, and/or receive data from a centralized computing device that has performed one or more functions of PPENS 6.

Figure 6A:
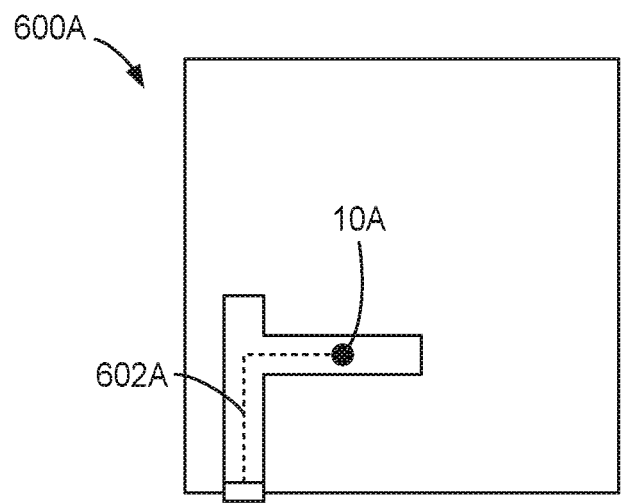
FIGS. 6A-6C are conceptual maps illustrating consolidation of maps from different agents, in accordance with one or more aspects of the present disclosure.
Figure 6B:
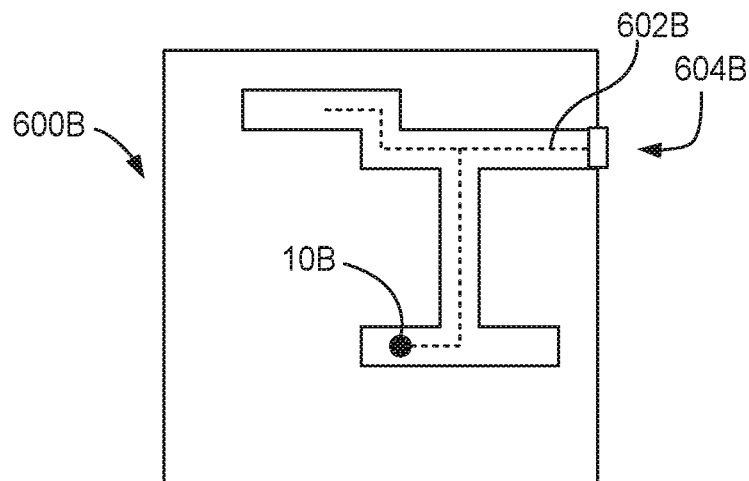
Figure 6C:
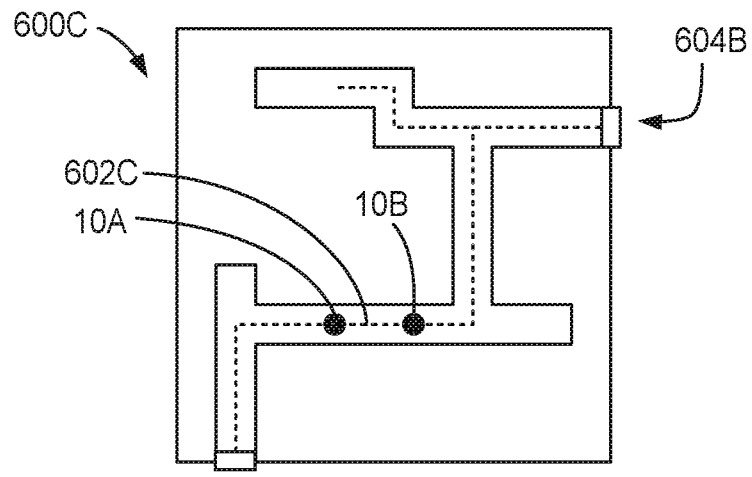

FIGS. 6A-6C are example maps of a hazardous environment (e.g., environment 8B) for agents 10 and illustrate how maps may be built and/or combined by integrating data from one or more sources of information (e.g., by PPENS 6).

FIG. 6A is an example component map 600A illustrating a first agent 10A on path 602A, while FIG. 6B is an example component map 600B illustrating a second agent 10B on path 602B. Prior to moving through environment 8, agent 10A may be positioned at a known point 604A (e.g., known from preexisting map data or GPS data) and agent 10B may be positioned at a known point 604B. As agent 10A moves through an environment from known point 604A, PPENS 6 generates and tracks a first series of poses corresponding to track 602A. As agent 10B moves through the environment from known starting point 604B, PPENS 6 generates and tracks a second series of poses corresponding to track 602B. PPENS 6 may compile an accurate estimate of each pose from measurements by an inertial measurement device, a radar device, a thermal image capture device, and/or a global positioning system (GPS) device. For example, PPENS 6 may receive radar data and inertial data from each of agent 10A and agent 10B and use the radar data to generate pose data that is more accurate and/or comprehensive in a visually obscured environment, such as by identifying one or more features within the visually obscured environment or generating velocity information relative to one or more objects in the visually obscured environment.

At some point, agent 10A and agent 10B may meet and exchange information. For example, each agent 10A and 10B has a respective track 602A and 602B and associated pose data and metadata that includes various confidences and features. These features may be relatively sparsely-collected such that, by exchanging information regarding tracks 602A and 602B, agents 10A and 10B may have more complete information regarding the environment. In some instances, a computing device (e.g., PPENS 6) of each agent 10A and agent 10B may exchange data offline to generate a composite track 602C. For example, PPENS 6 may reconcile various elements of tracks 602A and 602B into composite track 602C, such as combining a pose from track 602A and a pose from track 602B into a single pose.

FIG. 6C shows an example composite map 600C generated from component maps 600A and 600B of FIGS. 6A and 6B. As will be described further in FIGS. 7-10 below, PPENS 6 may combine maps 600A and 600B by aligning paths and matching common features between maps 600A and 600B. For example, paths 602A and 602B may be aligned by calculating a minimum pairwise distance between each point on each path, where a set of pairwise distances with the minimum total distance may determine overlapping parts of paths 602A and 602B. Paths 602A and 602B may also be aligned by adjusting (e.g., by scaling, translating, and/or rotating) each path to join path 602A to path 602B. As another example, a meeting point of agents 10A and 10B (e.g., as detected by line of sight and/or similar poses) may be considered a common place for maps 600A and 600B to be joined. Other common features include a fiducial marker that both agents 10A and 10B pass, or a landmark feature (e.g., a stairwell) that agents 10A and 10B both use. PPENS 6 uses the common features to link tracks 602A and 602B into composite track 602C. An abstract representation of combined track 602C of agents 10A and 10B may be shown in Table 7 below:

TABLE 7

| Agent(s) | Pose | | | | Pose Conf. | Motion Feat. | Spatial Feat. | Team Feat. | Land. Feat. | Therm. Feat. |
|---|---|---|---|---|---|---|---|---|---|---|
| | t | X, Y | Z | Quat. | | | | | | |
| 10A | | | | | | | | | | |
| 10B | | | | | | | | | | |
| 10A, B | | | | | | | | | | |

As illustrated in Table 7, combined track 602C may include poses of agent 10A, poses of agent 10B, and/or combined poses of agents 10A and 10B. By combining component maps 600A and 600B into composite map 600C, PPENS 6 enables cooperative exploration of environment 8. Moreover, if agent 10A becomes stranded in environment 8, knowledge of the tracks of agent 10B may facilitate a search and rescue, or vice versa. As such, combining maps 10A and 10B makes mapping of environment 8 more efficient and increases the safety of agents 10.

In some instances, various features of tracks 602A and/or 602B may have different degrees of importance, which may result in different priorities of the order in which data may be transferred. For example, various features used as passageways for navigation, such as exits or doors, may have a higher safety value than features used as navigational aids, such as interior windows or other landmarks. In examples in which map building functions of PPENS 6 are centralized, power or available bandwidth may limit the ability to transfer all the data. In examples in which map building functions of PPENS 6 are localized, data storage capacity or distance to other agents may limit the ability to transfer all the data. In these resource constrained situations, local data transfer and local processing may be desired to complete a partial map integration process that prioritizes these more important features. A respective computing device of agent 10A and/or agent 10B may automatically transfer a prioritized subset of tracked pose data to one another, such that a respective PPENS 6 of agent 10A and/or agent 10B may merge and reconcile pose metadata to enhance the information available to each agent. By prioritizing data transfer and enforcing an order-of-operations, PPENS 6 may maintain near real-time updates for agents while conserving power. Similarly, when PPENS 6 is a cloud-connected and/or cloud-processed service, PPENS 6 may apply data transfer prioritization in situations in which local power and bandwidth considerations may not permit entire datasets to be uploaded in real-time.

Regardless of whether map building functions of PPENS 6 are centralized or localized, an agent may prefer to receive information prior to sending information, and to use the received information to augment a respective track 602. In some examples, a respective PPENS 6 of agents 10A and 10B may alternate sending roles and progress through the tracked pose data according to a priority of the tracked pose data. As another example, such as in a firefighting situation (or similar contexts where the agents are wearing self-contained breathing apparatus), PPENS 6 of agents 10A and 10B may prioritize data transfer primarily in one direction for the benefit of the agent who is low on air, such as if there is a significant disparity in remaining air between the two agents or among the entire set of agents.

As an example, higher value information may include information for moving to exits. For example, PPENS 6 may send all pose data which indicates a high confidence of an exit to share a location of exits. As a next priority, PPENS 6 may send portions of tracked pose data which indicates poses along contiguous routes to exits, such as starting with a highest aggregate confidence, to share known routes to exits. As a next priority, PPENS 6 may send pose fields and associated metadata for poses on the routes to exits (e.g., landmark features, such as interior doors, and spatial features, such as walls), to share additional context about the known exit routes. For example, PPENS 6 may detect a known intersection point of tracks 602A and 602B, such as based on sensed or announced proximity of agents 10A and 10B, and choose an exit destination from which to extract features based on a short distance from exit to intersection (e.g., such as may be a probable exit path), a presence of walls (e.g., such as may be a guide for exit), and a presence of landmark features related to throughways such as doors, windows, or stairways. As a next priority, PPENS 6 may send other portion of remaining poses, such as starting with a present floor or exit floor.

As another example, higher value information may include information within some distance of agents. For example, PPENS 6 may send pose data related to a present pose of each agent, such as time, X, Y, and Z. As a next priority, PPENS 6 may send pose data within a first distance threshold of a respective agent 10 to share nearby tracks and context, as it may be likely to be valuable for agents that are near each other to exchange information, compared to agents that are far apart.

As another example, higher value information may include information about interior doors and walls. For example, PPENS 6 may send pose data that indicates a high confidence of an interior door or wall to share a location of interior doors or walls. As a next priority, PPENS 6 may send portions of tracked pose data (e.g., time, X, Y, Z) that indicates poses along contiguous routes to interior doors, such as starting with a highest aggregate confidence, to share known routes to interior doors. As a next priority, PPENS 6 may send pose data that indicates a moderate confidence of an interior door or wall.

Figure 7A:
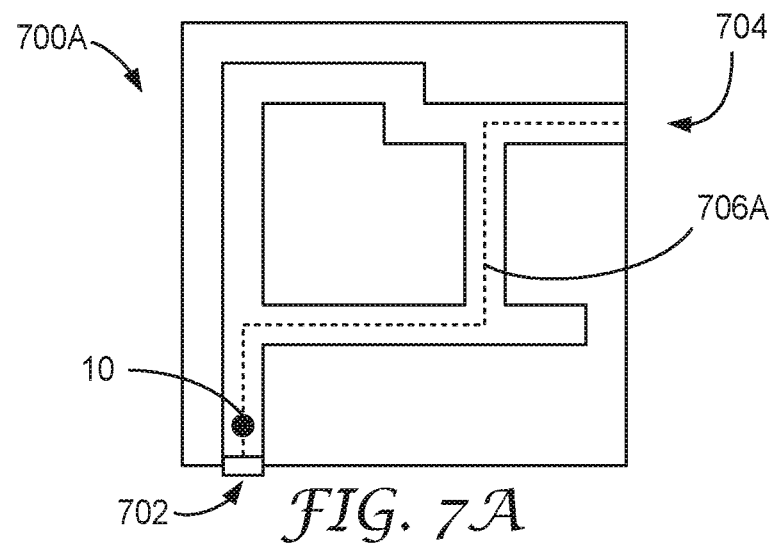
FIGS. 7A-7C are conceptual maps illustrating navigation of an agent based on an identified thermal feature, in accordance with one aspect of the present disclosure.
Figure 7B:
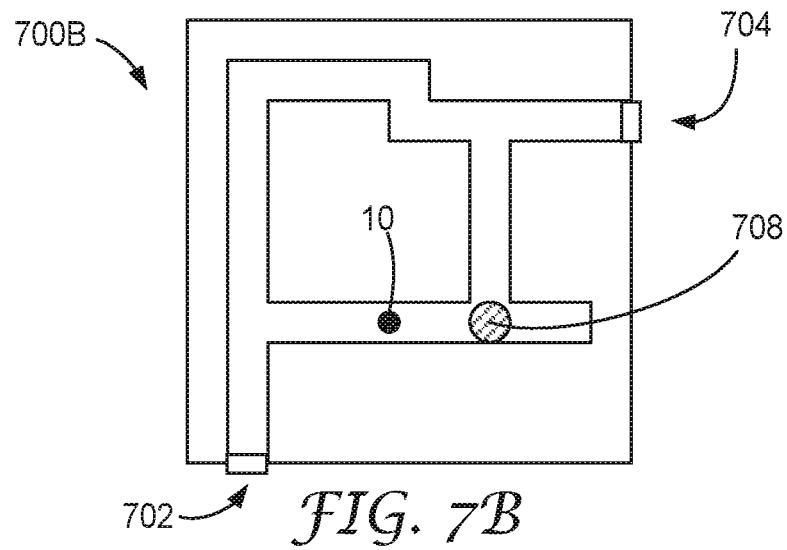
Figure 7C:
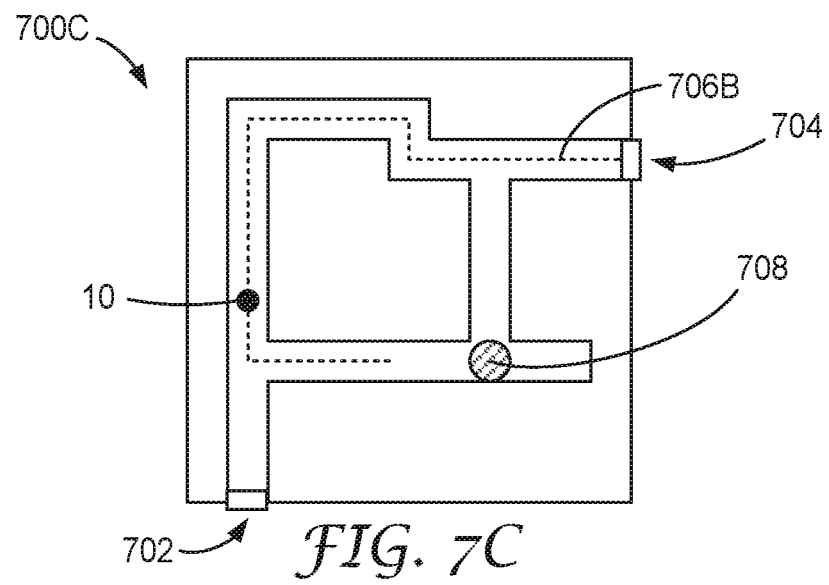

In some instances, PPE systems described herein may be configured to detect a thermal hazard based using thermal data from one or more agents and navigate an agent around the thermal hazard. FIG. 7A-7C are example maps of a hazardous environment (e.g., environment 8B) for agents 10 that illustrate how PPE systems described herein (e.g., PPENS 6) may provide a guidance route that navigates around a thermal hazard. Maps describes in FIGS. 7A-7C may be constructed using thermal information received from thermal sensors, such as a thermometer and/or a thermal image capture device.

FIG. 7A is an example map 700A illustrating movement of agent 10 on first path 706A. PPENS 6 may generate first path 706A on map 700A to provide agent 10 with a recommended route (e.g., fastest route or safest route) from a reference point 702 to a destination 704. In the example of FIG. 7A, PPENS 6 may generate first path 706A using a shortest-path algorithm based on best available information. In other examples, PPENS 6 may generate path 706A using a highest-confidence algorithm, as part or all of first path 706A may be known by agent 10 due to prior experience (e.g., an ingress or egress route). Based on the guidance provided by PPENS 6, agent 10 may choose to traverse first path 706A. In some cases, thermal information inaccuracies may arise from a motion of a thermal sensor. In such cases, PPENS 6 may use motion sensor data (e.g., from an inertial measurement device, a radar device, or the like) to differentiate motion of the thermal sensor from motion within the thermal data.

FIG. 7B is an example map 700B illustrating agent 10 encountering a thermal hazard 708. For example, agent 10 may be wearing PPE 13 that includes a thermal image capture device configured to generate thermal image data. The thermal image capture device may capture thermal image data of thermal hazard 708. PPENS 6 may process the thermal image data and identify one or more thermal properties of thermal hazard 708 based on the thermal image data, such as a spatial boundaries or variation of temperature of thermal hazard 708 (e.g., a size of a fire or layers of temperatures within the fire), temporal variation of thermal hazard 708 (e.g., movement of temperatures within the fire), and/or a relative temperature of thermal hazard 708 compared to other objects in the environment (e.g., an intensity of temperature of the fire). For example, steam released from a hose may dissipate and change in intensity based on both/either time (e.g., as the steam cools and/or condenses) and/or space (e.g., as the steam disperses over an area). Based on the thermal properties, PPENS 6 may classify thermal hazard 708 as a particular thermal feature, such as a fire. For example, PPENS 6 may evaluate a rate of cooling or dissipation as indicated by temporal or spatial changes, respectively, and classify thermal hazard 708 as stream based on the rates of cooling and/or dissipation. In some examples, PPENS 6 may receive thermal image data from another agent and classify thermal hazard 708 based on the thermal image data of both agents. Errors in the classification of thermal events may arise from a lack of data or a misinterpretation of data. In such cases, PPENS 6 may resolve errors by comparing thermal event classifications between agents 10 when combining maps from agents 10.

In some examples, PPENS 6 may determine a current location of agent 10 based on thermal hazard 708. For example, thermal hazard 708 may correspond to a landmark of the environment, such as a thermal feature previously identified by another agent or a thermal feature with a known location. In some examples, rather than use thermal image data to classify thermal hazard 708, PPE 13 may include a temperature sensor configured to generate temperature data, and PPENS 6 may determine a location of the agent based on the temperature data for the environment and known temperatures of the environment, such as a temperature associated with thermal hazard 708 and its corresponding location.

In some examples, PPENS 6 may determine a hazard level for thermal hazard 98. For example, PPENS 6 may determine that an intensity of temperature of thermal hazard 708 and a size of thermal hazard 708 are associated with a particular hazard level for a fire. PPENS 6 may determine that the hazard level of thermal hazard 708 exceeds a hazard threshold, such as hazard thresholds for temperature and size, such that thermal hazard 708 may not be safely navigated along route 706A.

In some examples, thermal hazard 708 may represent a potential or future thermal event. PPENS 6 may predict thermal hazard 708 based on the thermal features. For example, PPENS 6 may receive a series of thermal image data (e.g., a change in temperature over space and/or time) and determine that thermal hazard 708 includes a high temperature heat source and a presence of combustible gasses. Based on these thermal conditions, PPENS 6 may classify thermal hazard 708 as a present fire and a potential flashover. In some cases, PPENS 6 may classify thermal hazard 708 via a machine-learned model based on a library of templates of thermal events. In other cases, heuristics may be used to classify a thermal event. For example, PPENS 6 may consider both absolute temperatures of surfaces and surface temperatures relative to surrounding surfaces to differentiate hazards from non-hazards. As another example, PPENS 6 may label any air space showing steep thermal gradients as indicative of an incipient flashover (i.e., a dangerous explosion due to confined, heated gases). As yet another example, PPENS 6 may warn about any small, hot area in the vicinity of a large, hot area that has been suppressed (e.g., due to firefighting techniques), indicative of a residual fire.

In some instances, PPENS 6 may present thermal hazard 708 to agent 10 and/or a remote user. For example, PPENS 6 may render map 700B with color-coding to illustrate relative temperatures of surfaces (e.g., hotter areas are red, and colder areas are blue). As a result, map 700B may increase situational awareness.

In response to determining that thermal hazard 708 may not be navigated safely on first path 706A, PPENS 6 may generate a new second path 706B to avoid thermal hazard 708. FIG. 7C is an example map 700C illustrating agent 10 on second path 706B around thermal hazard 708. PPENS 6 may considers thermal hazard 708 in shortest-path algorithms and output second path 706B as a route that avoids thermal hazard 708 to arrive at destination 704. For example, a route may be determined by calculating a fastest route that maintains a minimal distance from a hazardous condition (e.g., a surface above a certain temperature, a thermal event with a hazard level score that meets a threshold hazard level, etc.).

Figure 8A:
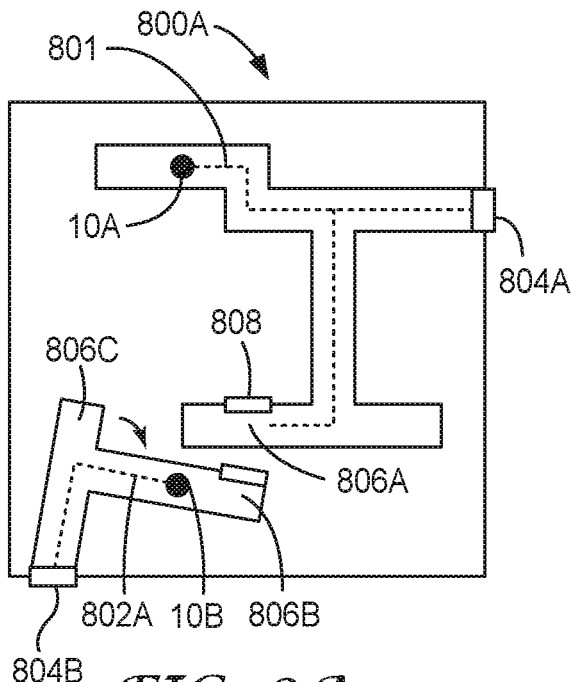
FIGS. 8A-8D are conceptual maps illustrating adjustment and consolidation of maps from different agents, in accordance with one aspect of the present disclosure.
Figure 8B:
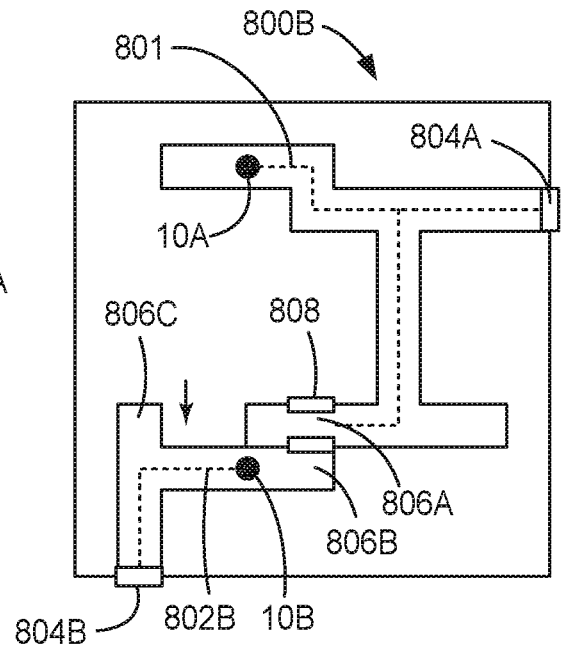
Figure 8C:
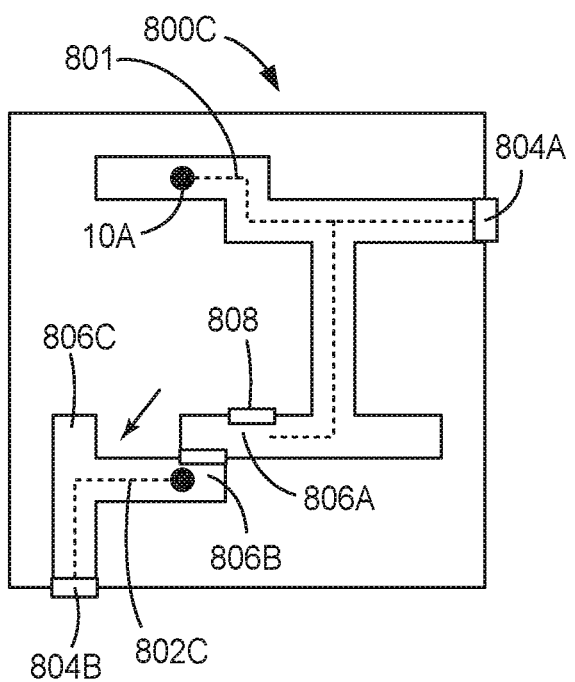
Figure 8D:
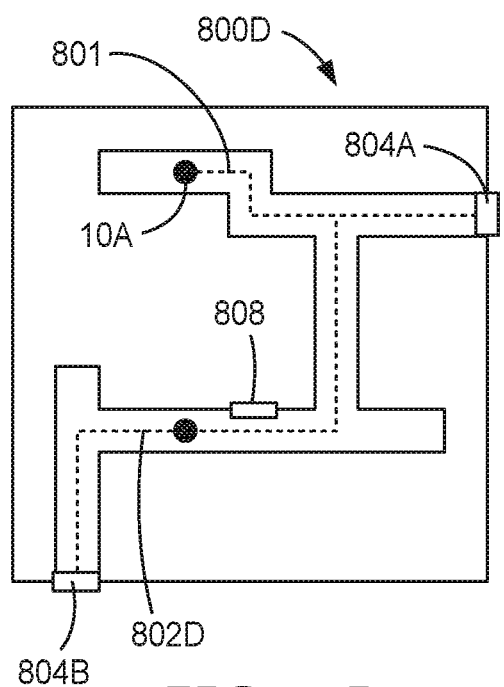

FIGS. 8A-8D are conceptual maps illustrating adjustment and consolidation of maps from different agents, in accordance with one aspect of the present disclosure. FIGS. 8A-8C represents maps that include at least one of angular or scaling errors, while FIG. 8D represents a map with the errors of FIGS. 8A-8C corrected. For simplicity, in the examples of FIGS. 8A-8C, correction will only be described with respect to reconciliation of an erroneous track with a correct track; however, it will be understood that corrective operations may be performed on any number of tracks. For example, path 801 may include features having a relatively high confidence with respect to features of path 802A, but in other examples, both paths may each have features that are higher and lower in confidence than conflicting features of the other path.

PPE systems (e.g., PPENS 6) may be configured to resolve angular errors between two or more tracks. FIG. 8A illustrates a map 800A with an angular error, as compared to correct map 800D of FIG. 8D. As shown in FIG. 8A, map 800A includes a first track 801 of a first agent 10A and a second track 802A of a second agent 10B. Due to proximity of tracks 801 and 802A, PPENS 6 may evaluate whether and/or how to consolidate tracks 801 and 802A. However, an angular error between track 801 and 802 may cause uncertainty about whether and/or how to combine the two tracks. For example, it may be ambiguous whether hallway 806A of track 801 joins with hallway 806B or hallway 806C of track 802A. However, by considering other features and/or by using accompanying confidence-based heuristics, PPENS 6 may consolidate track 801 and track 802A with a relatively high likelihood of accuracy.

In some instances, PPENS 6 may resolve errors using preexisting and/or structural knowledge of an environment. For example, a building may have relatively square features, such as hallways and rooms oriented at 90-degree angles. Using this knowledge, PPENS 6 may shift an angle of path 802A to align with a general orientation of path 801. In some instances, PPENS 6 may resolve errors by using a distance between path 802A and 801. For example, hallway 806A of path 801 is closer to hallway 806B than hallway 806C, such that PPENS 6 may rotate path 802A such that hallway 806B aligns with hallway 806A.

In some examples, PPENS 6 may resolve errors using one or more features, such as from pose metadata, associated with path 801 and path 802A. For example, path 801 and path 802A each include landmark features (an exit at starting point 804A and 804B, respectively, and a window 808), and several motion features for each track (left/right 90° turns and 180° turns). PPENS 6 may evaluate these features using various heuristics to evaluate possible hypotheses regarding the relationship between tracks 801 and 802A to determine a likeliest combination of tracks 801 and 802A. PPENS 6 may choose the hypothesis and implicated track joining action with the most supportive evidence and least evidence against, as illustrated in Table 8 below.

TABLE 8

| Hypothesis | Action | Positive | Neutral | Negative |
|---|---|---|---|---|
| Minimal angular errors | Do not combine | Exits stationary | Turns of track 802A misaligned with building | Turns misaligned with each other |
| Relative clockwise error present | Rotate track 802A to join hallway 806A and 806B | Exits stationary Turns aligned with each other and building Window 808 aligned | | |
| | Rotate track 801 to join hallway 806A and 806B | Exits stationary | Turns of track 802A misaligned with building | Turns of track 801 more misaligned with building |
| Relative counter-clockwise error present | Rotate track 802A to join hallway 806A and 806C | Exits stationary | | Turns misaligned with each other and building |
| | Rotate track 801 to join hallway 806A and 806C | Exits stationary and square turns of tracks aligned | Turns of track 802A misaligned with building | Turns more misaligned with each other and building |

In this example the best action is rotation of track 802A counter-clockwise to join hallways 806A and 806B. While not shown in this example, PPENS 6 may use numerical scoring of outcomes, including weighting factors determined through heuristic analysis, empirical research, and techniques such as machine learning.

In some examples, PPENS 6 may resolve errors using spatial features. For example, second agent 10B may identify a spatial feature, such as presence in hallway 806B or window 808, along second track 802A that is similar to a spatial feature identified by the first agent 10A along first track 802B. PPENS 6 may consider that agents 10A and 10B both detected walls with window 808 that might be joined. PPENS 6 may consider such matching with the matching of motion and landmark features described in Table 8 above.

FIG. 8B illustrates a map 800B with a north/south scaling error, as compared to correct map 800D of FIG. 8D. Similar to FIG. 8A, PPENS 6 may evaluate different hypotheses and actions, such as increasing scale of track 804B north/south, increasing a scale of track 804B east/west, rotating track 804B, and combinations thereof. Only the first solution brings hallways 806A and 806B together, and aligns corresponding motion features (turns). In some examples, PPENS 6 may perform a graduated scaling to track 802B. For example, PPENS 6 may increase stretching for points farther from an accurately-located origin point, such as 804B. For example, a measurement error may be likely to grow as agent 10B progresses farther from an accurately-located feature, such as 804B, especially for tracking approaches based on distance obtained by integration of acceleration or velocity.

FIG. 8C illustrates a map 800C with a northeast/southwest scaling error, as compared to correct map 800D of FIG. 8D. Similar to FIG. 8B, PPENS 6 may evaluate different hypotheses and actions, such as increasing scale of track 804B north/south, increasing a scale of track 804B east/west, rotating track 804B, and combinations thereof. Only a combination of the first and second solutions brings hallways 806A and 806B together, and aligns corresponding landmark features (e.g., window 808), as well as motion features (turns).

In addition to using map data, PPENS 6 may use pose metadata to resolve whether a wall or other structure separates two or more tracks or agents. For example, in map 800B of FIG. 8B, tracks 802B and 801 may be substantially close, but the location uncertainty may be sufficient that there may be an intervening obscuration, such as a wall.

PPENS 6 may collect sensor data about the surroundings, such as a relatively low-fidelity point cloud of objects in the scene from a radar device, and infer the likely presence or absence of walls in each direction. Without the sensor data about walls, PPENS 6 may detect proximity, but not necessarily room occupancy; however, with sensor data about nearby objects we can infer wall locations. In the example of FIG. 8B, a section of tracks 802B and 801 near hallway 806B and 806A, respectively may both include pose metadata indicating nearby walls in a same direction, supporting an inference that a wall does not separate tracks 802B and 801. However, if agents 10A and 10B were both near hallways 806A and 806B facing opposite directions, and could not see each other, then the inference may be that a wall separates them. This type of information may be important for navigation or situational awareness, as incorrectly instructing the agents to go through a wall to meet up or share an egress route could be hazardous.

While FIGS. 8A-8D have been described with respect to a single error correcting function, in some instances, one or more error correcting functions may be used to merge maps. In some examples, PPENS 6 may resolve errors using a relative hierarchy of operations. PPENS 6 may determine a straight-line direction based on motion features. For example, motion features may involve relative square turns. PPENS 6 may determine rotation for matching maps that may occur from yaw drift, such as by aligning motion features with a North-South-East-West (NSEW) grid. PPENS 6 may consider whether landmark or spatial features may be aligned. PPENS 6 may consider scaling or other transformations that may occur from translational drift, and as will be described below. In these various ways, PPENS 6 may efficiently align and combine maps.

Figure 9A:
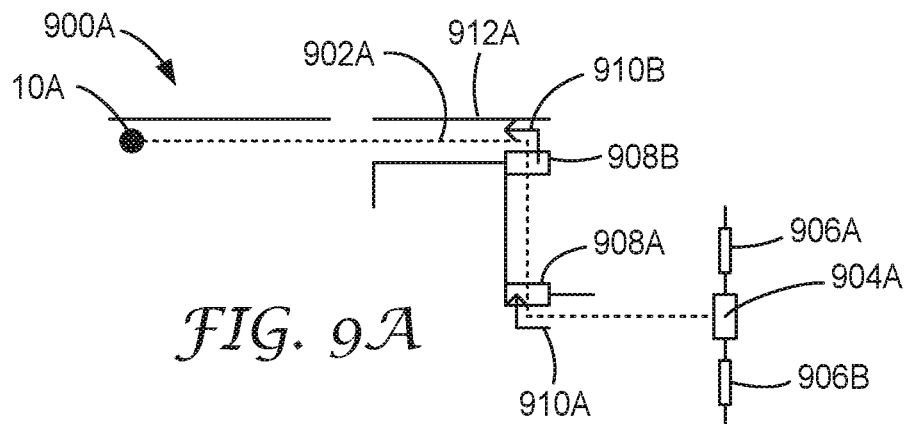
FIGS. 9A-9C are conceptual maps illustrating consolidation of features of maps from different agents, in accordance with one aspect of the present disclosure.
Figure 9B:
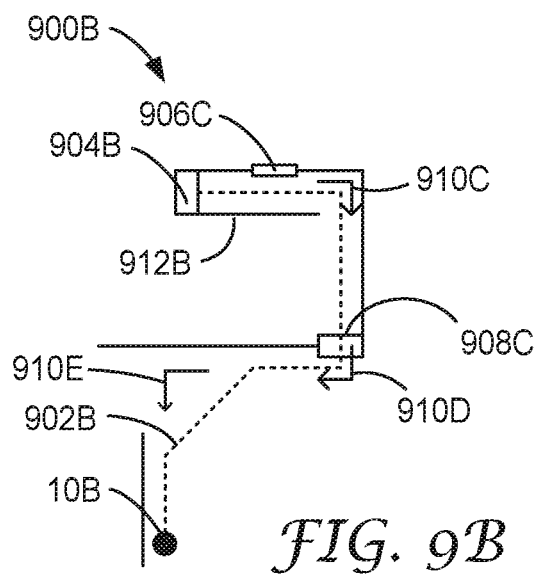
Figure 9C:
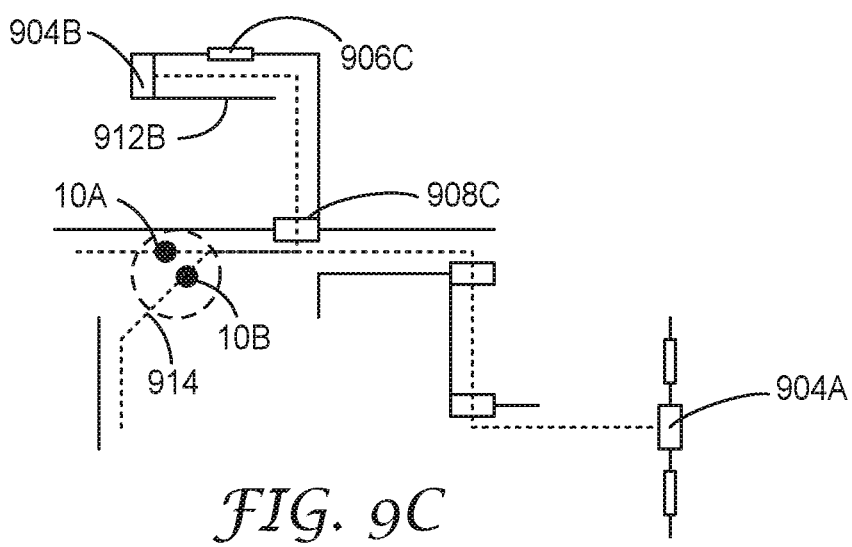

FIGS. 9A-9C are conceptual maps illustrating consolidation of features of maps from different agents, in accordance with one aspect of the present disclosure.

FIG. 9A is a conceptual first map 900A illustrating first agent 10A on first path 902A from exit 904A. As agent 10A moves through the environment, PPENS 6 may identify one or more features along path 902A. For example, PPENS 6 may use radar data to detect landmark features such as windows 906A and 906B near exit 904A, doors 908A and 908B, spatial features such as hallway 912A, and motion features such as two 90° turns 910A and 910B along path 902A.

FIG. 9B is a conceptual map 900B illustrating second agent 10B on second path 902B from exit 904B. As agent 10B moves through the environment, PPENS 6 may identify one or more features along path 902B. For example, PPENS 6 may use radar data to detect landmark features such as window 906C near exit 904B and door 908C, spatial features such as hallway 912B, and motion features such as three 90° turns along path 902B. PPENS 6 may also identify a wall separating agents 10A and 10B, as agents 10A and 10B may not be able to see each other.

As illustrated in FIGS. 9A and 9B above, PPENS 6 may not identify all features of an environment to provide a complete representation of the environment. For example, processing power may be relatively limited, such as in examples in which PPENS 6 may substantially reside in PPE 13 and/or communication hub 14. Rather, PPENS 6 may capture sufficient pose data and metadata such that various features may be used to improve navigation and/or reconcile maps to provide a more complete picture of the environment. PPENS 6 may identify the features from a combination of sensor data, manual entry (e.g., audio data), and outside information (e.g., data transmitted to agents 10 while agents 10 are in the environment or prior to agents 10 entering the environment). Data sources of these features for example could include entry or announcement by a human agent, GPS data, visible image data, thermal image data, inertial data, lidar data, radar data, and/or radio data. For environments with impaired visibility, such as smoke-filled spaces, thermal image data and radar image data may be preferred to visible image data or lidar data, respectively, as their wavelengths of operation greatly reduce the negative impact of smoke on effectiveness, as described above.

FIG. 9C is a conceptual composite map illustrating a combination of maps 900A and 900B of FIGS. 9A and 9B, respectively, after agents 10A and 10B exchange pose data. For example, agents 10A and 10B may meet at meeting point 914. PPENS 6 may interpret meeting point 914 as a feature of the environment with a highly-certain location. PPENS 6 may use meeting point 914 as a common feature to join maps 900A and 900B. Common features between two or more paths facilitate the combination of the paths. PPENS 6 may determine a confidence score for each common feature. The confidence score may depend on the type of common feature, the number of paths including the common feature, or the like. In some examples, common features do not have high enough certainty to contribute to path joining. For example, agents 10A and 10B have both encountered hallways, but they have no proof that they have encountered the same hallway. In some cases, agents 10A and 10B may have similar poses but still not be in the same hallway because, for instance, they are separated by a wall. As a result, the hallways alone may not be used as a common feature for joining maps 900A and 900B. In other examples, common features may have a high certainty and can be used to join maps. For example, PPENS 6 may identify common landmark features, such as door 908C, and align pose data to reduce error between pose data and/or metadata between respective tracks 902A and 902B. Alternatively or additionally, common features with high certainty may include a proximity of agents 10 to a landmark (e.g., a door, a window, a fiducial marker, or the like), a layout of a subspace (e.g., walls shaping a hallway or room), or a path shape (e.g., left or right turns). As a result, agent 10A may be aware of features encountered by agent 10B, and vice versa. In addition, other agents 10 in the environment and a command center may be aware of the features encountered by agents 10A and 10B.

PPENS 6 may further be configured to combine paths 902 of agents 10 with other paths. Other paths may include a path traveled by another agent 10 through the environment, a path from a previous visit (e.g., for a safety survey or a pre-planning exercise), or the like. PPENS 6 may receive other paths from a local device (e.g., via Bluetooth) or from a database. As a result of PPENS 6 combining paths, agents 10 may have increased awareness of the environment, such as additional features of the environment or a current location of other agents 10. Moreover, PPENS 6 may resolve tracking inaccuracies by reconciling differences (e.g., in orientation, angle, or scale) between two or more paths, refining a size of open spaces, or adding missing attributes of the environment (e.g., walls, doors, windows, and the like).

For example, agent 10A may now be aware of exit 904B and window 906C, including a route to these features, and that there is an interior door 908C, rather than what might have been inferred to be a continuous wall. As another example, agent 10A may now be aware of an existence of a wall to follow along an entire route to exit 904B. As another example, agent 10B may now be aware of exit 904A and windows 906A and 906B, including a route to these features. As another example, agent 10B may now be aware of a possibility that a wall may not run along an entire route to exit 904B, a potential disadvantage which could be factored into route planning combined with the relative unfamiliarity of the route to agent 10B. As another example, agent 10B may have increased confidence that there was indeed no wall on to a left of agent 10B, and that there was a wall on to a right of agent 10B, during the portion of the track where agent 10B was in proximity to agent 10A.

Beyond benefits to each agent 10 from an accurate combination of these two annotated tracks, the combination may also improve situational awareness, such as for an incident commander at a fire scene. For example, with pose data represented by tracks 902 and metadata represented by the features 904, 906, 908, 910, and 912, an incident commander may be able to provide context and instruction to agents 10 for activities. For example, the incident commander may provide information to agent 10B to complete a search of a room agent 10B is presently occupying. As another example, the incident commander may instruct agent 10A to retrace steps back to a hallway opening near meeting point 914, and either search an opposite side of a room or discover whether the room is separate space from a location of agent 10B. Such instructions may not be accurate if, for example, the combined map was unable to determine some of the wall structure.

In some cases, agents 10 have access to sufficient power and network bandwidth that they are able to share all information that they have collected about the environment, including all path data and all features of the environment. In such cases, agents 10 may share all data. In other cases, agents 10 may not have access to sufficient power or network bandwidth to share all data. In such cases, PPENS 6 may prioritize subsets of information and exchange the subsets in order of priority to conserve power and/or save time, as explained with respect to FIGS. 6A-6B. In the examples of FIGS. 9A-9C, PPENS 6 may exchange information regarding exits 904 and doors 906 along paths to exits 904, such that agents 10 may both have access to exit information. As a second priority, PPENS 6 may exchange information regarding windows 808 along paths to exits 904, as such windows may provide emergency escape. As a next priority, PPENS 6 may exchange other data related to features along paths 902. Some examples of categories with a high priority may include locations of exits, routes to exits, a current location of each agent 10, or tracks near the current location of each agent 10. Some examples of categories with a lower priority may include locations of interior doors and walls, routes to interior doors and walls, or tracks far from any locations of agents 10.

Figure 10A:
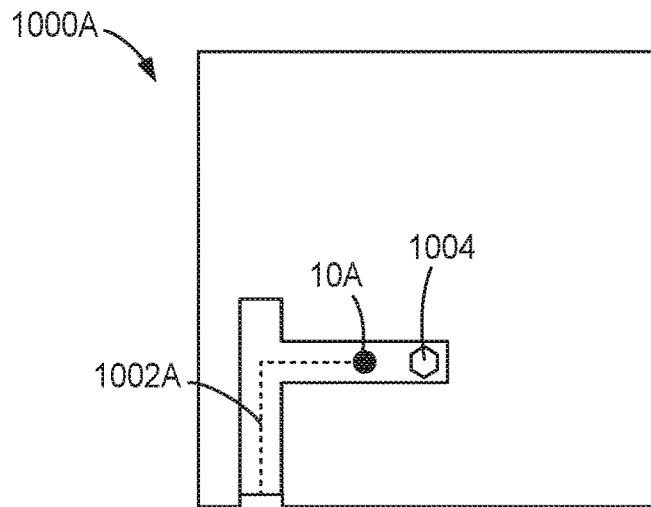
FIGS. 10A-10C are conceptual maps illustrating consolidation of maps from different agents based on a fiducial marker, in accordance with one aspect of the present disclosure.
Figure 10B:
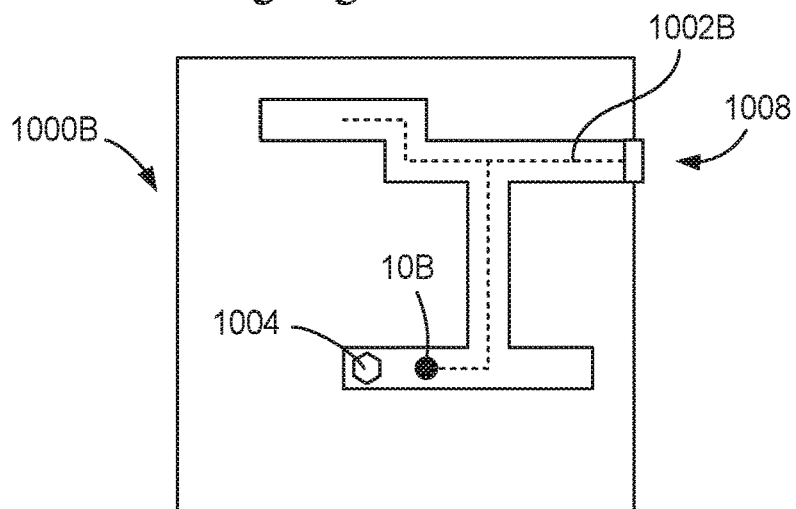
Figure 10C:
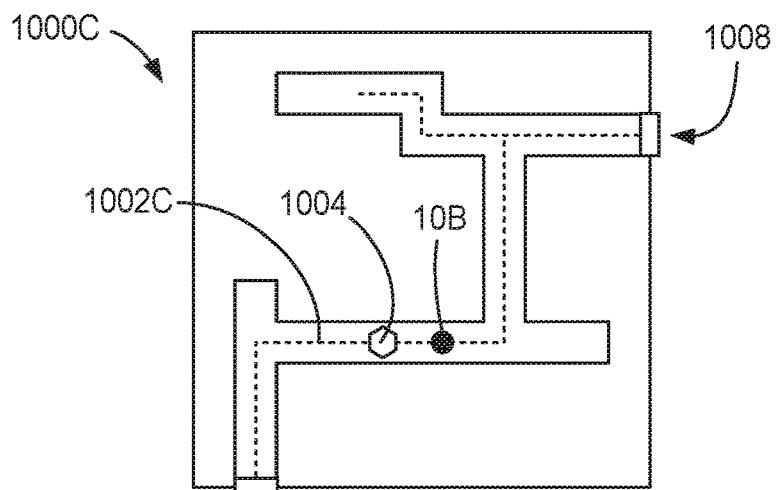

FIGS. 10A-10C are conceptual maps illustrating consolidation of maps from different agents based on a fiducial marker, in accordance with one aspect of the present disclosure. Fiducial markers may provide route guidance with additional information concerning a relative position to meaningful equipment or personnel. For example, addition of an active or passive fiducial marker may enable easier object identification and/or provide information that may be difficult to decode otherwise (for example, the GPS position of the object, the floorplan of the environment, what floor the item is located on, what hazards are present in an area, what PPE is required in an area, etc.).

PPENS 6 may use fiducial information obtained from fiducial markers for a variety of functions, as will be described below, including map improvement, such as loop closure, map correction, and multi-map combination; Navigation, such as toward fiducial markers indicating exits and/or objects; and/or situation awareness, such as a proximity/presence of one or more features, identification of one or more features, and/or orientation of an agent or one or more objects relative to the agent or another object. Information encoded in a fiducial may provide detailed information about a feature in the environment. For example, a fiducial attached to a landmark feature (e.g., a wall) may provide exact coordinates of the landmark. As another example, a fiducial may provide the identification of an object or person, such as a hose nozzle or agent 10. Such information may provide critical support for a search-and-rescue mission.

A fiducial may be encoded via a pattern that is accessible despite obscured visibility in the visually obscured environment. Patterns may include passive thermal infrared (e.g., varying emissivity), radar (e.g., patterned radar reflectors), or passive radio-reflectivity (e.g., radio frequency identification tags). In some cases, agents 10 and visible light sensors may not perceive fiducials with visual codes, such as bar codes or QR codes. In such cases, agents 10 may lack detailed information helpful for completing tasks. Therefore, fiducials that do not depend on visual sensors enhance the ability of agents 10 to complete tasks quickly and effectively. Fiducials may be configured to mount as a label on a location (e.g., an exit, a stairway, or the like), on a piece of equipment (e.g., a hose, a hose nozzle, or the like), or on agent 10 (e.g., mounted on an article of personal protective equipment).

FIG. 10A shows example component map 1000A with agent 10A in proximity to fiducial marker 1004. Agent 10A has moved through the environment from door 1006, as shown by path 1002A, and placed fiducial marker 1004 at the location near exit 1006. In some examples, fiducial marker 1004 may have a fixed, known location associated with placement of fiducial marker 1004. For example, an indication of fiducial marker 1004 may be associated with exit 1006. In such cases, PPENS 6 may correct tracking inaccuracies by calibrating a sensor with fiducial marker 1004 or by adjusting a map to conform to a location of fiducial marker 1004. PPENS 6 also may refine the size of an open space from a line of sight of a sensor with fiducial marker 1004 or may enhance map combination by referencing fiducial marker 1004 as a common feature between two or more maps.

Fiducial marker 1004 may be positioned at a variety of different times before or during an incident. In some examples, fiducial marker 1004 may be positioned during a walkthrough. A walkthrough may include any survey before or during an incident in which one or more fiducial markers 1004 are associated with one or more positions.

In some instances, agent 10A may position fiducial marker 1004 prior to an incident, such as during pre-planning. For example, agent 10A may position fiducial marker 1004 and program a database (e.g., fiducial datastore 48K of FIG. 2) to indicate a particular position of fiducial marker 1004. In some instances, PPENS 6 may associate fiducial marker 1004 within one or more positions within the environment based on third party data. For example, PPENS 6 may use additional context surrounding fiducial marker 1004 to determine a position of fiducial marker 1004 within the environment.

In some instances, fiducial marker 1004 may not have a predefined position, but may be placed during an incident. For example, agent 10A may place fiducial marker 1004 at a location in a building upon a first visit to that location. In this case, fiducial marker 1004 may provide orientation information for one or more agents 10 that encounter fiducial marker 1004, such as by resetting potentially-drifted information from an inertial data, radar data, and other sensor data. For example, fiducial marker 1004 may be detected a second time by the same agent 10, after traveling away from it and then returning, such that any accumulated error along the intervening path may be corrected (e.g., "loop closure").

While fiducial marker 1004 has been described with respect to landmark features, in some examples, fiducial markers 1004 may be associated with team features. As one example, an agent 10 may wear fiducial marker 1004 as part of PPE 13. For example agent 10 may mount fiducial marker 1004 on a helmet to support visibility from a distance, mount fiducial marker 1004 on boots to support visibility in smoky conditions (e.g., smoke may be less dense near the floor), and/or mount fiducial marker 1004 on shoulder straps, and/or mount fiducial marker 1004 on a facepiece to provide information about gaze direction. In such cases, PPENS 6 may indicate a proximity between agents 10 and may identify agents 10 based on their respective fiducials. As another example, a piece of equipment may include a fiducial marker 1004. For example, a specific piece or type of equipment, such as a nozzle of a hose, may provide identification information (e.g., the type of equipment) or orientation information (e.g., a direction of operation of equipment).

FIG. 10B shows example component map 1000B with agent 10B in proximity to fiducial marker 1004. Agent 10B has moved through the environment from exit 1008, as shown by path 1002B. Sensor data from agent 10B indicates fiducial marker 1004. PPENS 6 processes the sensor data to generate fiducial data from fiducial marker 1004.

In some examples, PPENS 6 may detect fiducial marker 1004 using radar data. For example, fiducial marker 1004 may be configured to be detected by radar waves. PPE 13 may include a radar device that includes an antenna "wave source" and an antenna fiducial receptor. Fiducial marker 1004 may include a 2D pattern as alternate squares of radar-reflecting (using specifically selected materials with unique relative permittivity values) and "stealth" material. In some examples, PPENS 6 may detect fiducial marker 1004 using thermal image data. For example, fiducial marker 1004 may be configured with a particular emissivity. PPE 13 may include a high-functionality thermal image capture device, such that a light source and reflection may not be needed, as emissivity may not depend on reflection. As such, the thermal image capture device may require less energy than, for example, a radar device. In some examples, PPENS 6 may use visible and/or infrared fiducial markers when they are detected, and use thermal image data and radar fiducial markers when visible and/or infrared fiducial markers are not detected.

In some examples, PPENS 6 may determine a presence and/or proximity of a landmark feature, team feature, and/or spatial feature using the indication of fiducial marker 1004. For example, agent 10B may be in a visually obscured environment without awareness of a position of a hallway. PPENS 6 may process sensor data that includes an indication of fiducial marker 1004 and determine a presence and/or proximity of fiducial marker 1004 to agent 10B. As a result, agent 10B may proceed toward fiducial marker 1004.

In some examples, PPENS 6 may determine an identity of a landmark feature and/or team feature using the indication of fiducial marker 1004. For example, agent 10B may be unaware of a particular floor or area of a building. PPENS 6 may process sensor data that includes an indication of fiducial marker 1004, determine an identity of fiducial marker 1004, and determine a location of agent 10B within the building based on fiducial marker 1004.

In some examples, PPENS 6 may determine an orientation of agent 10 using the indication of fiducial marker 1004. For example, agent 10B may be unsure of a direction towards fiducial marker 1004. PPENS 6 may determine a directionality of fiducial marker 1004. PPE 13 may include an array of detectors configured to detect a pattern in a Field of View (FOV). PPENS 6 may determine the directionality by comparing the FOV obtained from different detectors. In some examples, PPE 13 may include a narrow-angle FOV detector, and PPENS 6 may correlate the FOV to orientation information gained from sensor data, such as radar data and/or inertial data. As another example, PPE 13 may include a wide-angle FOV detector configured to provide directionality from a position on the array.

PPENS 6 may use fiducial marker 1004 to join paths in a composite map. For example, fiducial marker may be associated with a landmark feature (e.g., exit 1006), team feature (e.g., an axe near fiducial marker 1004), and/or spatial feature (e.g., a hallway) have a relatively high confidence and/or certainty. As a result, when one or more agents 10 with respective PPE 13 encounter fiducial marker, fiducial marker 1004 may be a high-certainty common feature between paths 1002 of agents 10 and may enable PPENS 6 to join the paths 1002. FIG. 10C shows example composite map 1000C generated from component maps 1000A-B. Paths 1002A-B are combined to form path 1002C based on fiducial marker 1004, which is a common feature between maps 1000A-B. As a result, agents 10 and a command center may be aware of path 1002C between door 1006 and 1008, potential exits from the environment.

In addition to fiducial marker 1004, common features between two or more maps may facilitate a combination of two or more paths on the maps. As explained above, fiducial marker 1004 may indicate a fixed, known location. A line of sight between each of agents 10 and fiducial marker 1004 may indicate that, in addition to having similar poses, agents 10 are in the same hallway, not separated by a wall.

Figure 11A:
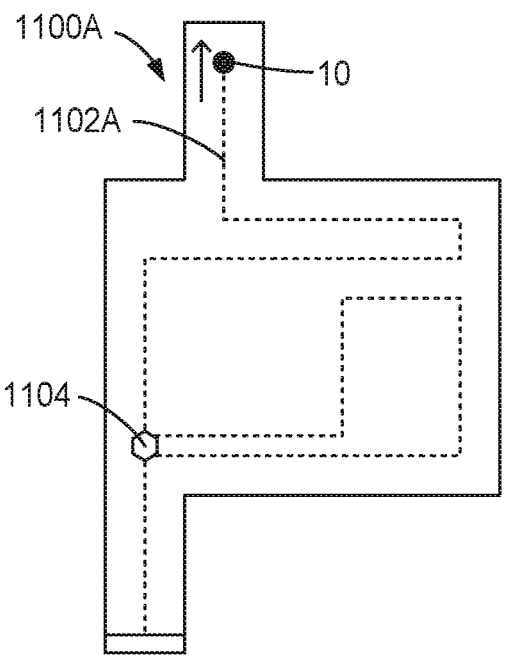
FIGS. 11A-11C are conceptual maps illustrating navigation of an agent based on a fiducial marker, in accordance with one aspect of the present disclosure.
Figure 11B:
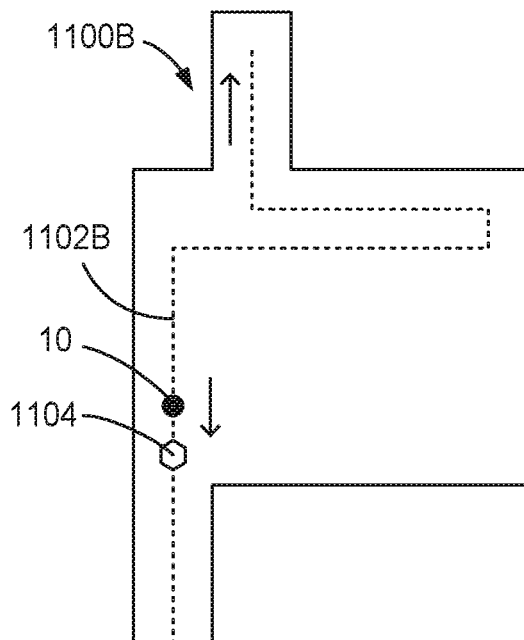
Figure 11C:
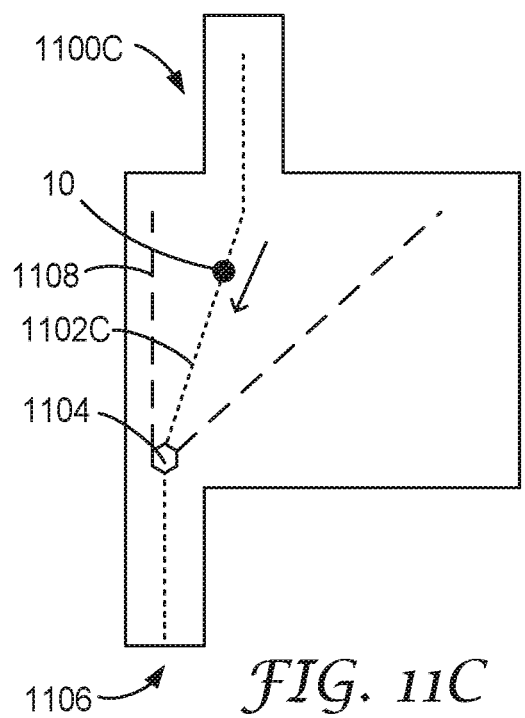

FIGS. 11A-11C are conceptual maps illustrating navigation of an agent based on a fiducial marker, in accordance with one aspect of the present disclosure. FIG. 11A-C may illustrate how a fiducial may enhance navigation for one agent 10 through a visually obscured environment. In some cases, as depicted in FIG. 10A-C, a fiducial may enhance navigation by providing a common feature between respective paths of two or more agents 10, enabling PPENS 6 to join the paths or identify a location. In other cases, as depicted in FIG. 11A-C, a fiducial marker may enhance navigation for an agent 10 without preexisting information about an environment, such as in absence of a composite map joining respective paths of agents 10.

FIG. 11A is a conceptual map 1100A illustrating ingress of agent 10A. In the example of FIG. 11A, agent 10 moves along path 1102A from exit 1106 and encounters fiducial marker 1004. Agent 10 continues to explore the visually obscured environment, and again encounters fiducial marker 1004. PPENS 6 may be configured to associate path 1102A with a same point associated with fiducial marker 1104, such that fiducial marker 1104 may close a previous loop of path 1102A. In some examples, path 1102A of agent 10 may accumulate error (e.g., from sensor error) while agent 10 traverses path 1102A. Upon encountering fiducial marker 1102A a second time, PPENS 6 may correct path 1102A. As a result, when agent 10 encounters fiducial marker 1104 a second time, PPENS 6 may reliably confirm a position of agent 10 relative to previous positions. Agent 10 continues to explore the visually obscured environment.

FIG. 11B is a conceptual map 1100B illustrating egress of agent 10 along track 1102B. Agent 10 may continue along a previous path 1102A used for ingress until encountering fiducial marker 1104. For example, PPENS 6 may store sufficient pose data to generate a path from a present location to fiducial marker 1104. Upon encountering and identifying fiducial marker 1004, PPENS 6 may determine that fiducial marker 1004 is associated with a closure position of a loop of previous path 1102A that may be avoided. As a result, agent 10 may continue to exit 1106 without proceeding through a remainder of path 1102B.

In some examples, PPENS 6 may use fiducial marker 1104 to direct agent 10 to a particular location. FIG. 11C is a conceptual map 1100C illustrating egress of agent 10 along path 1102C. Agent 10 may generate sensor data that includes an indication of fiducial marker 1104 based on a line-of-sight with fiducial marker 1104. For example, radar data may include a detected pattern or thermal image data may include a detected emissivity of fiducial marker 1104. PPENS 6 may identify fiducial marker 1104 based on the sensor data, such that agent 10 may be aware of fiducial marker 1104, despite visual obscurations between agent 10 and fiducial marker 1104. As a result, rather than continuing down previous paths 1102A or 1102B, agent 10B may proceed along a line of site between agent 10 and fiducial marker 1104. As a result, agent 10B may navigate toward fiducial marker 1104 and exit 1106 faster than along another egress path that follows a preexisting route. In examples not shown in FIG. 11C, an environment may include more than one fiducial marker to enable navigation toward a succession of the fiducial markers to complete egress, such as to more quickly reach a location or avoid a hazard.

In some examples, fiducial marker 1104 may provide directionality. For example, fiducial marker 1104 may include a range of approach 1108 within which one or more sensors of agent 10 may determine a directionality with regard to a plane of fiducial marker 1104. Agent 10 may generate sensor data that includes an indication of directionality with fiducial marker 1104. PPENS 6 may determine an orientation of agent 10 with respect to fiducial marker 1104 based on the directionality of fiducial marker 1104. For example, PPENS 6 may determine that agent 10 is facing about SSW and may correct an orientation of agent 10.

Figure 12:
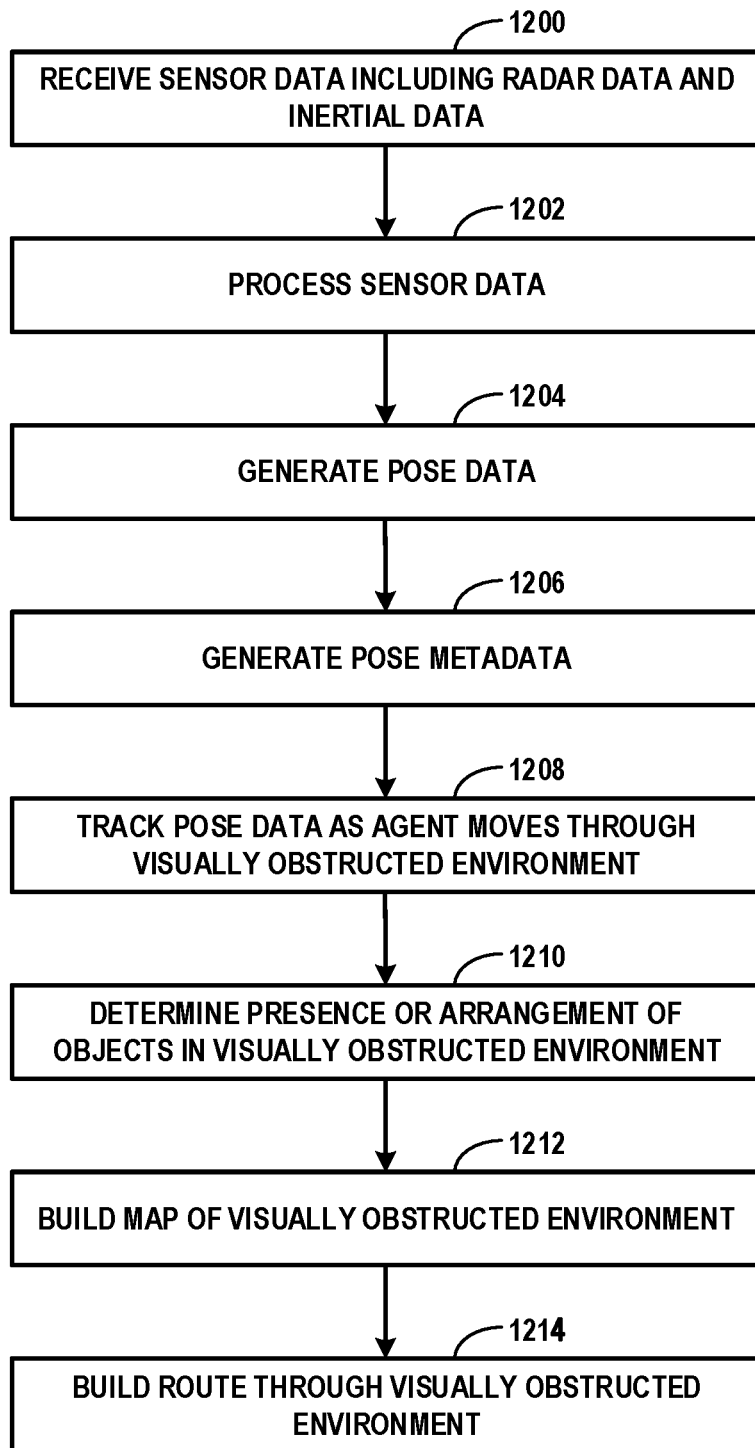
FIG. 12 is a flowchart illustrating an example technique for navigating a visually obscured environment using radar data.

FIG. 12 is a flowchart illustrating an example technique for navigating a visually obscured environment using radar data. The example technique of FIG. 13 will be described with respect to FIG. 1; however, the example technique of FIG. 13 may be used with a variety of systems. PPENS 6 receives, from PPE 13 worn by agent 10, sensor data that includes at least radar data from a radar device and inertial data from an inertial measurement device (1200). PPENS 6 processes the sensor data from the sensor assembly (1202). PPENS 6 generates pose data of agent 10 based on the processed sensor data (1204). The pose data includes a location and an orientation of agent 10 as a function of time. PPENS 6 may generate the pose data based on a relative weighting between the radar data and the inertial data.

PPENS 6 generates, based on at least one of the sensor data or the tracked pose data, pose metadata that represents one or more features of the visually obscured environment (1206). The radar data comprises coarse-grain information indicating the presence or arrangement of objects within the visually obscured environment. For example, the one or more features include at least one of one or more motion features corresponding to movement of the agent through the environment, one or more spatial features corresponding to relative position of objects in the environment, one or more team features corresponding to one or more agents in the environment, one or more landmark features corresponding to one or more objects in the environment, or one or more thermal features corresponding to one or more thermal properties of the environment. As another example, the pose metadata may include one or more confidence scores corresponding to the one or more features of the environment. The one or more confidence scores may represent a relative likelihood of the one or more features being accurately identified. As another example, the pose metadata may represent one or more features identified by an audible command by one or more agents.

PPENS 6 tracks the pose data of the agent as the agent moves through a visually obscured environment (1208). PPENS 6 determines a presence or arrangement of objects within the visually obscured environment based on the radar data (1210). For example, the radar data may include coarse-grain information about the presence or arrangement of objects within the visually obscured environment.

PPENS 6 builds, using the radar data, a map of the visually obscured environment (1212). For example, the agent may be a first agent and the pose metadata may be first pose metadata that represents a first set of one or more features in the environment. PPENS 6 may receive second pose metadata for a second agent. The second pose metadata may represent a second set of one or more features in the environment. PPENS 6 may generate map data of the environment based on the first and second pose metadata. PPENS 6 may determine corresponding features between the first set of one or more features and the second set of one or more features and correct a difference between the corresponding features by at least one of translating, scaling, or rotating a subset of the corresponding features.

PPENS 6 builds a route for agent 10 through environment 8 using pose data (e.g., associated with a position and orientation of agent 10) and/or metadata (e.g., associated with one or more features of agent 10 or environment 8 and/or confidences for poses or features) (1212). For example, PPENS 6 may determine a route agent 10 from a past, present, or future location to a destination. In some examples, PPENS 6 may build a route based on a shortest distance (e.g., a shortest distance between a present location and a destination), a safest route (e.g., a route that avoids known or potential hazards), a known route (e.g., a previous route travelled by agent 10 or another agent), a common route (e.g., a route that may be traversed with one or more other agents), and other factors that may influence a safety or utility of agent 10. PPENS 6 may communicate the route to agent 10. For example, PPENS 6 may display the route over the map and/or provide audio directions to agent 10.

Figure 13:
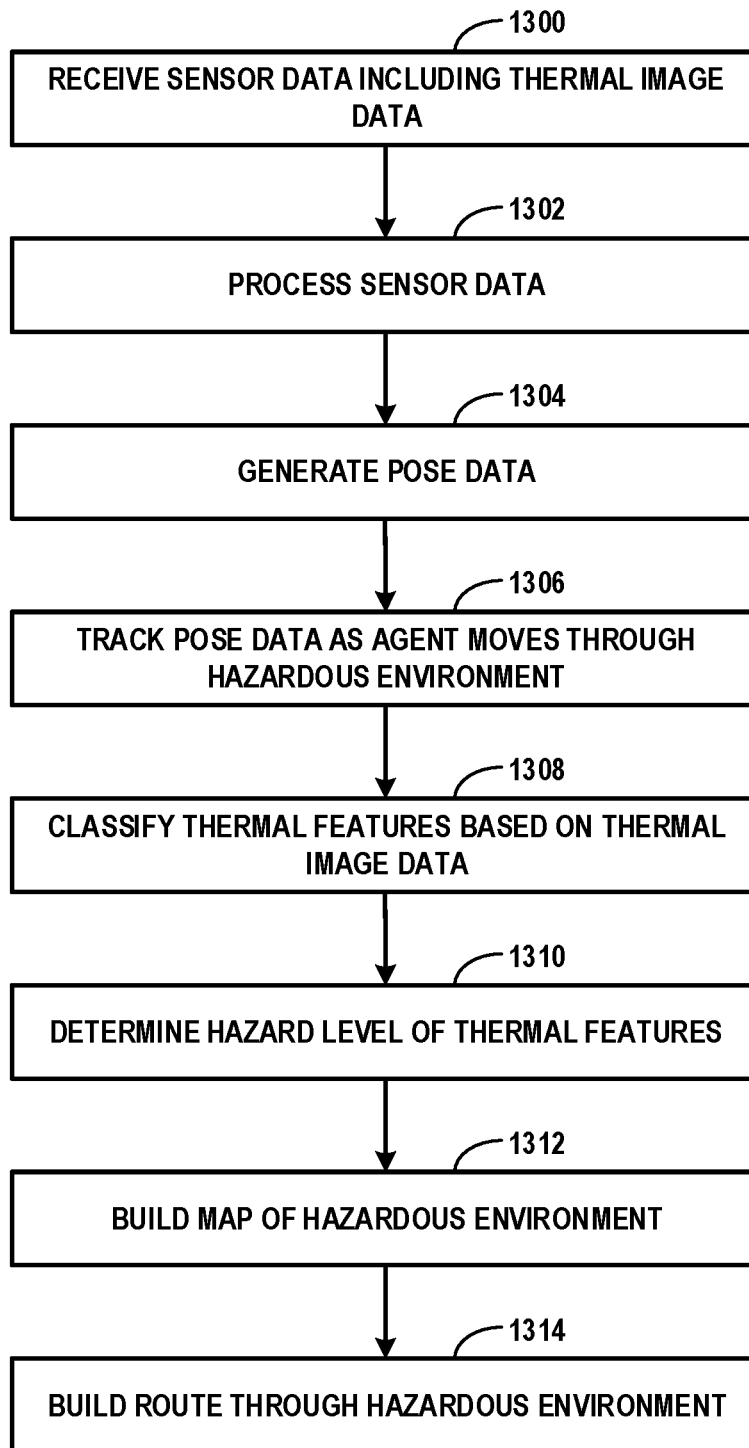
FIG. 13 is a flowchart illustrating an example technique for navigating a hazardous environment using thermal image data.

FIG. 13 is a flowchart illustrating an example technique for navigating a hazardous environment using thermal image data. The example technique of FIG. 13 will be described with respect to FIG. 1; however, the example technique of FIG. 13 may be used with a variety of systems. PPENS 6 receives, from PPE 13 worn by agent 10, sensor data that includes thermal image data from a thermal image capture device of PPE 13 (1300). PPENS 6 processes the sensor data from the sensor assembly (1302). PPENS 6 generates pose data of agent 10 based on the processed sensor data (1304). The pose data includes a location and an orientation of agent 10 as a function of time. PPENS 6 tracks the pose data of agent 10 as agent 10 moves through an environment (1306).

PPENS 6 classifies one or more thermal features of the environment based on the thermal image data (1308). PPENS 6 may classify the one or more thermal features based on a temporal signature of the thermal image data. The temporal signature may indicate a change in temperature of the one or more thermal features over time. PPENS 6 may classify the one or more thermal features based on a spatial signature of the thermal image data. The spatial signature may indicate a change in temperature of the one or more thermal features over space. PPENS 6 may predict a future thermal event based on the one or more thermal features. In some examples, agent 10 is a first agent 10A and the thermal image data is first thermal image data of first agent 10A in the environment. PPENS 6 receives second thermal image data of a second agent 10B in the environment. PPENS 6 classifies the one or more thermal features of the environment based on the first and second thermal image data.

PPENS 6 determines a hazard level for the one or more thermal features (1310). PPENS 6 may determine that the hazard level of the one or more thermal features meets a hazard threshold. PPENS 6 builds a map of the environment that includes the one or more thermal features (1312).

PPENS 6 may build a route through environment 8 to avoid the one or more thermal features (1314). For example, PPENS 6 may initially determine a route for agent 10 from a past, present, or future location to a destination based a shortest distance (e.g., a shortest distance between a present location and a destination), a safest route (e.g., a route that avoids known or potential hazards, including the one or more thermal features), a known route (e.g., a previous route travelled by agent 10 or another agent), a common route (e.g., a route that may be traversed with one or more other agents), and other factors that may influence a safety or utility of agent 10. PPENS 6 may communicate the route to agent 10. For example, PPENS 6 may display the route over the map and/or provide audio directions to agent 10.

Figure 14:
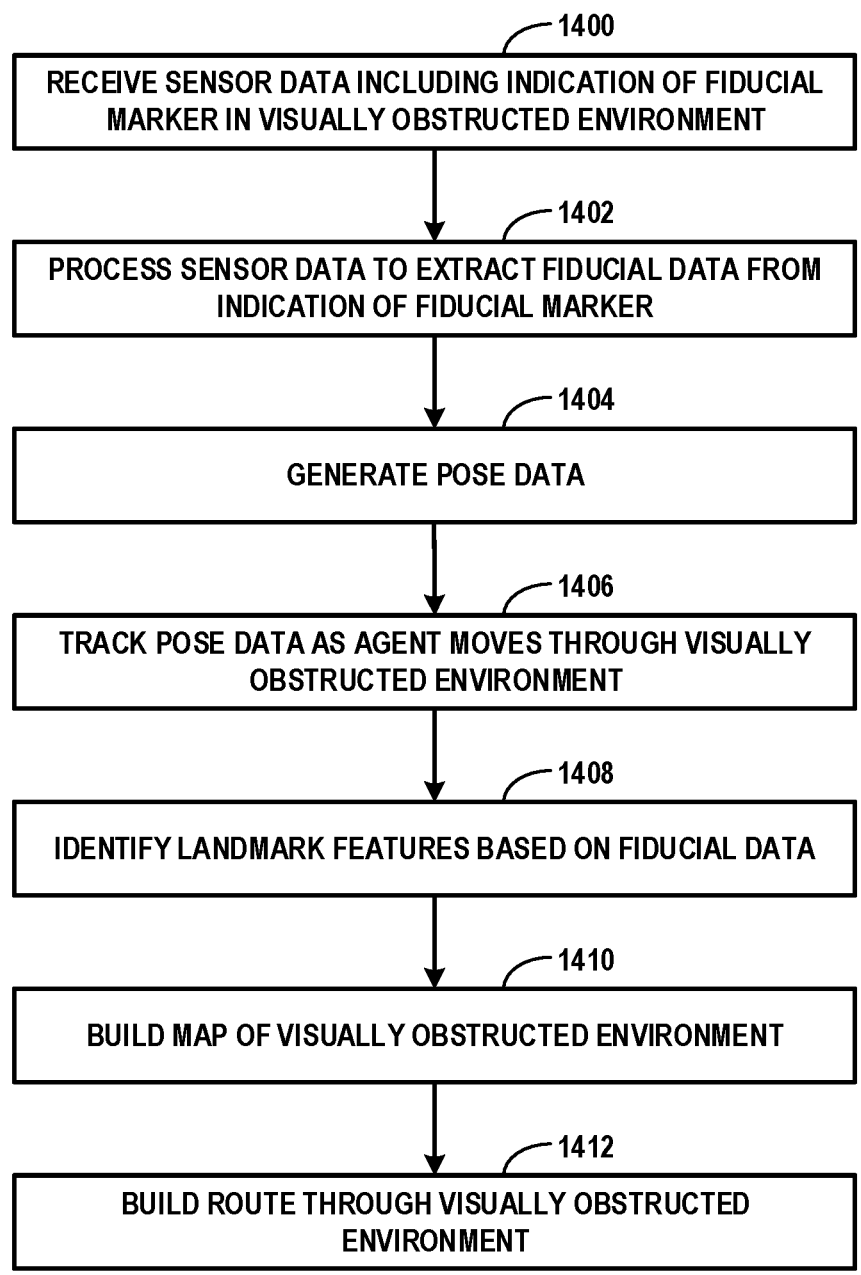
FIG. 14 is a flowchart illustrating an example technique for navigating a visually obscured environment using fiducial data.

FIG. 14 is a flowchart illustrating an example technique for navigating a visually obscured environment using fiducial data. The example technique of FIG. 14 will be described with respect to FIG. 1; however, the example technique of FIG. 14 may be used with a variety of systems. PPENS 6 receives, from PPE 13 worn by agent 10, sensor data that includes an indication of fiducial marker 21 in a visually obscured environment (1400).

PPENS 6 processes the sensor data to extract fiducial data from the indication of fiducial marker 21 (1402). The fiducial data may include a code stored or embodied on fiducial marker 21. In some examples, fiducial marker 21 includes an emissive surface and PPE 13 includes a thermal image capture device. PPENS 6 may detect a pattern or level of emissivity in the emissive surface based on thermal image data. In some examples, fiducial marker 21 includes a reflective surface configured to reflect electromagnetic radiation corresponding to a pattern. For example, the reflective surface may reflect long-infrared radiation and PPE 13 may include a thermal image capture device configured to generate thermal image data from the reflected long-infrared radiation. PPENS 6 may detect a pattern in the reflective surface based on thermal image data. As another example, the reflective surface may reflect radio waves or microwaves and PPE 13 may include a radar device configured to generate radar data from the reflected radio waves or microwaves. PPENS 6 may detect a pattern in the reflective surface based on the radar data. In some examples, PPENS 6 may operate at least one of a radar device or a thermal image capture device in response to determining that a visible image capture device may not capture the visible or infrared light. In some examples, fiducial marker 21 may emit a wireless signal that includes the fiducial data and PPE 13 may detect the wireless signal based on a relative proximity to fiducial marker 21.

PPENS 6 generates pose data and/or pose metadata of agent 10 based on the fiducial data (1404). The pose data includes a location and an orientation of agent 10 as a function of time. PPENS 6 may generate the pose data based on a relative weighting between the fiducial data and other sensor data. PPENS 6 may change the relative weighting based on at least one of a distance or a time of movement of the agent from the fiducial marker. PPENS 6 tracks the pose data of agent 10 as agent 10 moves through the visually obscured environment (1406).

PPENS 6 identifies one or more landmark features based on the fiducial data from fiducial marker 21 (1408). In some examples, PPENS 6 determines a position of agent 10 based on the one or more landmark features. For example, PPENS 6 may determine, based on the one or more landmark features, that a space between the agent and the one or more landmark features is unobscured.

PPENS 6 builds, using the fiducial data, a map of the visually obscured environment (1410). In some examples, agent 10 is a first agent 10A, the pose data is first pose data, and the fiducial data is first fiducial data. PPENS 6 may receive second pose data of the second agent that includes second fiducial data. PPENS 6 may determining whether the first fiducial data matches the second fiducial data. In response to determining that the first fiducial data matches the second fiducial data, PPENS 6 may generate map data based on the first and second pose data. PPENS 6 may generate the map data by aligning the one or more landmark features based on the first fiducial data and the second fiducial data.

PPENS 6 builds a route for agent 10 through environment 8 using pose data (e.g., associated with a position and orientation of agent 10) and/or metadata (e.g., associated with one or more features of agent 10 or environment 8 and/or confidences for poses or features) (1412). For example, PPENS 6 may determine a route agent 10 from a past, present, or future location to a destination. In some examples, PPENS 6 may build a route based on a shortest distance (e.g., a shortest distance between a present location, such as determined by fiducial data, and a destination), a safest route (e.g., a route that avoids known or potential hazards), a known route (e.g., a previous route travelled by agent 10 or another agent, and/or a route indicated by fiducial data), a common route (e.g., a route that may be traversed with one or more other agents), and other factors that may influence a safety or utility of agent 10. PPENS 6 may communicate the route to agent 10. For example, PPENS 6 may display the route over the map and/or provide audio directions to agent 10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

EXAMPLES

Example 1: A system comprising: a personal protective equipment (PPE) configured to be worn by an agent, wherein the PPE includes a sensor assembly comprising one or more sensors configured to generate sensor data that includes an indication of a fiducial marker in a visually obscured environment; and at least one computing device comprising a memory and one or more processors coupled to the memory, wherein the at least one computing device is configured to: process the sensor data from the sensor assembly to extract fiducial data from the indication of the fiducial marker; generate pose data of the agent based on the fiducial data, wherein the pose data includes a location and an orientation of the agent as a function of time; and track the pose data of the agent as the agent moves through the visually obscured environment.

Example 2: The system of Example 1, wherein the PPE comprises a breathing apparatus that includes a wearable pack and headgear, and wherein the sensor assembly is integrated within at least one of a frame of the wearable pack, the headgear, or a handheld sensor.

Example 3: The system of Example 1 or 2, wherein the fiducial data includes a code stored or embodied on the fiducial marker.

Example 4: The system of any of Examples 1 to 3, wherein the at least one computing device is configured to build, using the fiducial data, a map of the visually obscured environment.

Example 5: The system of any of Examples 1 to 4, wherein the at least one computing device is configured to: identify one or more landmark features based on the fiducial marker; and determine a position of the agent based on the one or more landmark features.

Example 6: The system of Example 5, wherein the one or more landmark features comprise at least one of an object, a door, a window, a sign, a fiducial, an entry, an exit, a stairway, or a room status.

Example 7: The system of Example 5, wherein the at least one computing device is configured to determine, based on the one or more landmark features, that a space between the agent and the one or more landmark features is unobscured.

Example 8: The system of Examples 1 to 7, wherein the fiducial marker comprises an emissive surface, wherein the sensor assembly comprises a thermal image capture device, and wherein the at least one computing device is configured to detect a pattern or level of emissivity in the emissive surface based on thermal image data.

Example 9: The system of any of Examples 1 to 8, wherein the fiducial marker comprises a reflective surface configured to reflect electromagnetic radiation corresponding to a pattern.

Example 10: The system of Example 9, wherein the electromagnetic radiation has a wavelength greater than about 1 micrometer.

Example 11: The system of Example 9, wherein the reflective surface is configured to reflect long-infrared radiation, wherein the sensor assembly comprises a thermal image capture device configured to generate thermal image data from the reflected long-infrared radiation, and wherein the at least one computing device is configured to detect a pattern in the reflective surface based on thermal image data.

Example 12: The system of Example 11, wherein the sensor assembly further comprises a thermal energy source configured to emit the long-infrared radiation.

Example 13: The system of any of Examples 9 to 12, wherein the reflective surface is configured to reflect radio waves or microwaves, wherein the sensor assembly comprises a radar device configured to generate radar data from the reflected radio waves or microwaves, and wherein the at least one computing device is configured to detect a pattern in the reflective surface based on the radar data.

Example 14: The system of claim 9, wherein the reflective surface is configured to reflect long-infrared radiation and radio waves or microwaves, wherein the sensor assembly comprises a thermal image capture device configured to generate thermal image data from the reflected long-infrared radiation, wherein the sensor assembly comprises a radar device configured to generate radar data from the reflected radio waves or microwaves, and wherein the at least one computing device is configured to detect a pattern in the reflective surface based on at least one of the thermal image data or the radar data.

Example 15: The system of any of claims 9 to 14, wherein the at least one computing device is configured to operate at least one of a radar device or a thermal image capture device in response to determining that a visible image capture device may not capture the visible or infrared light.

Example 16: The system of any of Examples 1 to 15, wherein the fiducial marker is configured to emit a wireless signal that includes the fiducial data.

Example 17: The system of Example 16, wherein the sensor assembly is configured to detect the wireless signal based on a relative proximity to the fiducial marker.

Example 18: The system of any of Examples 1 to 17, wherein the at least one computing device is configured to generate the pose data based on a relative weighting between the fiducial data and other sensor data.

Example 19: The system of Example 18, wherein the at least one computing device is configured to change the relative weighting based on at least one of a distance or a time of movement of the agent from the fiducial marker.

Example 20: The system of any of Examples 1 to 19, wherein the agent is a first agent, wherein the pose data is first pose data, wherein the fiducial data is first fiducial data, and wherein the at least one computing device is further configured to: receive second pose data of the second agent, wherein the second pose data includes second fiducial data; and determine whether the first fiducial data matches the second fiducial data.

Example 21. The system of Example 20, wherein the at least one computing device is configured to, in response to determining that the first fiducial data matches the second fiducial data, generate map data based on the first and second pose data.

Example 22. The system of Example 21, wherein the at least one computing device is configured to generate the map data by aligning the one or more landmark features based on the first fiducial data and the second fiducial data.

Example 23. A method, comprising: receiving, by at least one computing device and from a sensor assembly of a personal protective equipment (PPE) worn by an agent, sensor data, wherein the sensor data includes an indication of a fiducial marker in a visually obscured environment; processing, by the at least one computing device, the sensor data from the sensor assembly to extract fiducial data from the indication of the fiducial marker; generating, by the at least one computing device, pose data of the agent based on the fiducial data, wherein the pose data includes a location and an orientation of the agent as a function of time; and tracking, by the at least one computing device, the pose data of the agent as the agent moves through the visually obscured environment.

Example 24: The method of Example 23, wherein the fiducial data includes a code stored or embodied on the fiducial marker.

Example 25: The method of Example 23 or 24, further comprising building, by the at least one computing device and using the fiducial data, a map of the visually obscured environment.

Example 26: The method of any of Examples 23 to 25, further comprising: identifying, by the at least one computing device, one or more landmark features based on the fiducial marker; and determining, by the at least one computing device, a position of the agent based on the one or more landmark features.

Example 27: The method of Example 26, further comprising determining, by the at least one computing device and based on the one or more landmark features, that a space between the agent and the one or more landmark features is unobscured.

Example 28: The method of any of Examples 23 to 27, wherein the fiducial marker comprises an emissive surface, wherein the sensor assembly comprises a thermal image capture device, and wherein the method further comprises detecting, by the at least one computing device, a pattern or level of emissivity in the emissive surface based on thermal image data.

Example 29: The method of any of Examples 23 to 28, wherein the fiducial marker comprises a reflective surface configured to reflect electromagnetic radiation corresponding to a pattern.

Example 30: The method of Example 29, wherein the reflective surface is configured to reflect long-infrared radiation, wherein the sensor assembly comprises a thermal image capture device configured to generate thermal image data from the reflected long-infrared radiation, and wherein the method further comprises detecting, by the at least one computing device, a pattern in the reflective surface based on thermal image data.

Example 31: The method of Example 30, further comprising emitting, by a thermal energy source, the long-infrared radiation.

Example 32: The method of any of Examples 29 to 31, wherein the reflective surface is configured to reflect radio waves or microwaves, wherein the sensor assembly comprises a radar device configured to generate radar data from the reflected radio waves or microwaves, and wherein the method further comprises detecting, by the at least one computing device, a pattern in the reflective surface based on the radar data.

Example 33: The method of any of Examples 29 to 32, further comprising operating, by the at least one computing device, at least one of a radar device or a thermal image capture device in response to determining that a visible image capture device may not capture the visible or infrared light.

Example 34: The method of any of Examples 23 to 33, wherein the fiducial marker is configured to emit a wireless signal that includes the fiducial data.

Example 35: The method of Example 34, wherein the sensor assembly is configured to detect the wireless signal based on a relative proximity to the fiducial marker.

Example 36: The method of any of Examples 23 to 35, further comprising generating, by the at least one computing device, the pose data based on a relative weighting between the fiducial data and other sensor data.

Example 37: The method of Example 36, further comprising changing, by the at least one computing device, the relative weighting based on at least one of a distance or a time of movement of the agent from the fiducial marker.

Example 38: The method of any of Examples 23 to 37, wherein the agent is a first agent, wherein the pose data is first pose data, wherein the fiducial data is first fiducial data, and wherein the method further comprises: receiving, by the at least one computing device, second pose data of the second agent, wherein the second pose data includes second fiducial data; and determining, by the at least one computing device, whether the first fiducial data matches the second fiducial data.

Example 39: The method of Example 38, further comprising generating, by the at least one computing device and in response to determining that the first fiducial data matches the second fiducial data, map data based on the first and second pose data.

Example 40: The method of Example 39, further comprising generating, by the at least one computing device, the map data by aligning the one or more landmark features based on the first fiducial data and the second fiducial data.

Various examples of the disclosure have been described. These and other examples are within the scope of the following claims.

What is claimed is:

1. A system comprising:
a personal protective equipment (PPE) configured to be worn by an agent, wherein the PPE includes a sensor assembly comprising one or more sensors configured to generate sensor data that includes an indication of a fiducial marker in a visually obscured environment;
a physical fiducial marker that is placed within the visually obscured environment; and
at least one computing device comprising a memory and one or more processors coupled to the memory, wherein the at least one computing device is configured to:

process the sensor data from the sensor assembly to extract fiducial data from the indication of the fiducial marker;

record, in a fiducial datastore, a particular position of the fiducial marker in the visually obscured environment based on one or more inputs from the agent;

associate the fiducial marker with one or more positions in the visually obscured environment based on third-party data;

use additional context surrounding the fiducial marker, as indicated by the third-party data, to determine or refine a position of the fiducial marker within the visually obscured environment;

generate pose data of the agent based on the fiducial data, wherein the pose data includes a location and an orientation of the agent as a function of time; and track the pose data of the agent as the agent moves through the visually obscured environment.

2. The system of claim 1,
wherein the PPE comprises a breathing apparatus that includes a wearable pack and headgear, and
wherein the sensor assembly is integrated within at least one of a frame of the wearable pack, the headgear, or a handheld sensor.

3. The system of claim 1, wherein the fiducial data includes a code stored or embodied on the fiducial marker.

4. The system of claim 1, wherein the at least one computing device is configured to build, using the fiducial data, a map of the visually obscured environment.

5. The system of claim 1, wherein the at least one computing device is further configured to:
identify one or more landmark features based on the fiducial marker, the fiducial marker comprising at least one of an object, a door, a window, a sign, a fiducial, an entry, an exit, a stairway, or a room status; and
determine a position of the agent based on the one or more landmark features.

6. The system of claim 5, wherein the at least one computing device is configured to determine, based on the one or more landmark features, that a space between the agent and the one or more landmark features is unobscured.

7. The system of claim 1,
wherein the fiducial marker comprises an emissive surface,
wherein the sensor assembly comprises a thermal image capture device, and
wherein the at least one computing device is configured to detect a pattern or level of emissivity in the emissive surface based on thermal image data.

8. The system of claim 1, wherein the fiducial marker comprises a reflective surface configured to reflect electromagnetic radiation corresponding to a pattern.

9. The system of claim 8,
wherein the reflective surface is configured to reflect long-infrared radiation,
wherein the sensor assembly comprises a thermal image capture device configured to generate thermal image data from the reflected long-infrared radiation and a thermal energy source configured to emit the long-infrared radiation, and
wherein the at least one computing device is configured to detect a pattern in the reflective surface based on thermal image data.

10. The system of claim 8,
wherein the reflective surface is configured to reflect radio waves or microwaves,
wherein the sensor assembly comprises a radar device configured to generate radar data from the reflected radio waves or microwaves, and
wherein the at least one computing device is configured to detect a pattern in the reflective surface based on the radar data.

11. The system of claim 8,
wherein the reflective surface is configured to reflect long-infrared radiation and radio waves or microwaves,
wherein the sensor assembly comprises a thermal image capture device configured to generate thermal image data from the reflected long-infrared radiation,
wherein the sensor assembly comprises a radar device configured to generate radar data from the reflected radio waves or microwaves, and
wherein the at least one computing device is configured to detect a pattern in the reflective surface based on at least one of the thermal image data or the radar data.

12. The system of claim 8, wherein the at least one computing device is configured to operate at least one of a radar device or a thermal image capture device in response to determining that a visible image capture device may not capture visible or infrared light.

13. The system of claim 1, wherein the fiducial marker is configured to emit a wireless signal that includes the fiducial data, and wherein the sensor assembly is configured to detect the wireless signal based on a relative proximity to the fiducial marker.

14. The system of claim 1, wherein the at least one computing device is further configured to:
generate the pose data based on a relative weighting between the fiducial data and other sensor data; and
change the relative weighting based on at least one of a distance or a time of movement of the agent from the fiducial marker.

15. The system of claim 1,
wherein the agent is a first agent,
wherein the pose data is first pose data,
wherein the fiducial data is first fiducial data, and
wherein the at least one computing device is further configured to:
receive second pose data of a second agent, wherein the second pose data includes second fiducial data;
determine that the first fiducial data matches the second fiducial data; and
based on the determination that the first fiducial data matches the second fiducial data, align the one or more landmark features based on the first fiducial data and the second fiducial data to generate map data based on the first and second pose data.

16. A system comprising:
a personal protective equipment (PPE) configured to be worn by a first agent, wherein the PPE includes a sensor assembly comprising one or more sensors configured to generate sensor data that includes an indication of a fiducial marker in a visually obscured environment; and
at least one computing device comprising a memory and one or more processors coupled to the memory, wherein the at least one computing device is configured to:
process the sensor data from the sensor assembly to extract first fiducial data from the indication of the fiducial marker;

generate first pose data of the agent based on the first fiducial data, wherein the first pose data includes a location and an orientation of the first agent as a function of time; and track the fits pose data of the first agent as the first agent moves through the visually obscured environment;

receive second pose data of a second agent, wherein the second pose data includes second fiducial data;

determine that the first fiducial data matches the second fiducial data; and based on the determination that the first fiducial data matches the second fiducial data, align the one or more landmark features based on the first fiducial data and the second fiducial data to generate map data based on the first and second pose data.

17. The system of claim 16, wherein the first fiducial data and the second fiducial data comprises the same fiducial marker, wherein the at least one computing device is further configured to:

identify one or more landmark features based on the fiducial marker, the fiducial marker comprising at least one of an object, a door, a window, a sign, a fiducial, an entry, an exit, a stairway, or a room status; and determine a position of the agent based on the one or more landmark features.

18. The system of claim 16, wherein the at least one computing device is further configured to:

generate the first pose data based on a relative weighting between the first fiducial data and the second fiducial data; and change the relative weighting based on at least one of a distance or a time of movement of the agent from the fiducial marker.

19. The system of claim 16, wherein the fiducial marker comprises a reflective surface configured to reflect electromagnetic radiation corresponding to a pattern.

20. The system of claim 16, wherein the reflective surface is configured to reflect long-infrared radiation and radio waves or microwaves, wherein the sensor assembly comprises a thermal image capture device configured to generate thermal image data from the reflected long-infrared radiation, wherein the sensor assembly comprises a radar device configured to generate radar data from the reflected radio waves or microwaves, and wherein the at least one computing device is configured to detect a pattern in the reflective surface based on at least one of the thermal image data or the radar data.

* * * * *